(12) United States Patent
Tan

(10) Patent No.: US 12,545,365 B2
(45) Date of Patent: Feb. 10, 2026

(54) OPERATING DEVICE FOR HUMAN-POWERED VEHICLE

(71) Applicant: Shimano Inc., Osaka (JP)

(72) Inventor: Shaun Ji Sheng Tan, Bukit Batok (SG)

(73) Assignee: Shimano Inc., Osaka (JP)

( * ) Notice: Subject to any disclaimer, the term of this patent is extended or adjusted under 35 U.S.C. 154(b) by 41 days.

(21) Appl. No.: 18/535,858

(22) Filed: Dec. 11, 2023

(65) Prior Publication Data

US 2025/0187704 A1 Jun. 12, 2025

(51) Int. Cl.
*B62M 25/04* (2006.01)
(52) U.S. Cl.
CPC .................... *B62M 25/04* (2013.01)
(58) Field of Classification Search
None
See application file for complete search history.

(56) References Cited

U.S. PATENT DOCUMENTS 9,932,091 B2 * 4/2018 Kawakami ............. B62K 23/06

* cited by examiner

*Primary Examiner* — Vicky A Johnson
*(74) Attorney, Agent, or Firm* — Spencer Fane LLP

(57) ABSTRACT

An operating device includes a support structure, a ratchet member, a positioning member, a release member, a first user operating member, a first pawl and a second pawl. The ratchet member is movable between a plurality of predetermined positions. The positioning member includes a positioning pawl that selectively engages the ratchet member to selectively establish the predetermined positions. The release member is movable between a first position and a second position to disengage the positioning pawl from the ratchet member so the ratchet member can move in a releasing direction. The first pawl and the second pawl are pivotally supported on the first user operating member around different pivot axes. The first pawl moves the release member from the first position to the second position during operation of the first user operating member. The second pawl moves the ratchet member in a pulling direction.

21 Claims, 27 Drawing Sheets

OPERATING DEVICE FOR HUMAN-POWERED VEHICLE

BACKGROUND

Technical Field

This disclosure generally relates to an operating device for a human-powered vehicle.

Background Information

Human-powered vehicles such as bicycles are typically provided with one or more operating devices for operating one or more components. In the case of a bicycle, examples of some these components include a gear changing device (e.g., a derailleur or an internally geared hub), a suspension and a seatpost. An operating device is usually provided on a human-powered vehicle in a location (e.g., on a handlebar) that is easy for a rider to operate the operating device. The operating device is often connected to the component with, for example, a control cable such as a Bowden-type cable. The control cable is pulled or released by the operating device to remotely operate the component.

SUMMARY

Generally, the present disclosure is directed to various features of an operating device for operating a component of a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, an operating device is provided to a human-powered vehicle. The operating device basically comprises a support structure, a ratchet member, a positioning member, a release member, a first user operating member, a first pawl and a second pawl. The ratchet member is movably supported with respect to the support structure between a plurality of predetermined positions. The positioning member includes a positioning pawl movably supported with respect to the support structure between a holding position and a releasing position. The positioning pawl is selectively engaged with the ratchet member to selectively establish the predetermined positions in the holding position. The release member is movably arranged with respect to the support structure between a first position and a second position. The release member is configured to disengage the positioning pawl from the ratchet member for permitting movement of the ratchet member in a releasing direction during movement of the release member from the first position to the second position. The first user operating member is movably supported with respect to the support structure from a first non-operated position to a first operated position. The first pawl is pivotally supported on the first user operating member around a first pivot axis. The first pawl is configured to move the release member from the first position to the second position during movement of the first user operating member from the first non-operated position to the first operated position. The second pawl is pivotally supported on the first user operating member around a second pivot axis. The second pivot axis is offset from the first pivot axis. The second pawl is configured to move the ratchet member in a pulling direction. The pulling direction is different from the releasing direction.

With the operating device according to the first aspect, it is possible to reduce the costs of manufacturing the operating device by having the first pawl and the second pawl pivotally supported on the first user operating member while also making the operating device robust.

In accordance with a second aspect of the present disclosure, the operating device according to the first aspect is configured so that the first pawl is biased towards engagement with the release member.

With the operating device according to the second aspect, the first pawl can reliably engage the release member to move the release member from the first position to the second position during movement of the first user operating member from the first non-operated position to the first operated position.

In accordance with a third aspect of the present disclosure, the operating device according to the second aspect is configured so that the first pawl contacts the release member where the first user operating member is disposed in the first non-operated position.

With the operating device according to the third aspect, the first pawl can quickly engage the release member without delay as the first user operating member moves from the first non-operated position to the first operated position.

In accordance with a fourth aspect of the present disclosure, the operating device according to any one of the first aspect to the third aspect is configured so that the second pawl is biased towards engagement with the ratchet member.

With the operating device according to the fourth aspect, the second pawl can reliably engage the ratchet member to move the ratchet member in a pulling direction.

In accordance with a fifth aspect of the present disclosure, the operating device according to any one of the first aspect to the fourth aspect is configured so that the second pawl is spaced from the ratchet member where the first user operating member is disposed in the first non-operated position.

With the operating device according to the fifth aspect, the second pawl does not interfere with the ratchet member during a releasing operation.

In accordance with a sixth aspect of the present disclosure, the operating device according to any one of the first aspect to the fifth aspect is configured so that the positioning pawl is biased towards the holding position.

With the operating device according to the sixth aspect, the positioning pawl can be reliably engaged with the ratchet member to establish a current position of the ratchet member among the plurality of the predetermined positions.

In accordance with a seventh aspect of the present disclosure, the operating device according to any one of the first aspect to the sixth aspect is configured so that the positioning pawl is pivotally supported with respect to the support structure about a third pivot axis. The third pivot axis is offset from the first pivot axis and the second pivot axis.

With the operating device according to the seventh aspect, it is possible to make the operating device compact while making the operating device robust.

In accordance with an eighth aspect of the present disclosure, the operating device according to any one of the first aspect to the seventh aspect is configured so that the release member is biased towards the first position.

With the operating device according to the eighth aspect, it is possible for the release member to return to a ready position after the release member has been moved to the second position.

In accordance with a ninth aspect of the present disclosure, the operating device according to any one of the first aspect to the eighth aspect is configured so that the positioning member includes a stop pawl movably arranged with respect to the support structure between a stopping position where the stop pawl stops a releasing movement of the ratchet member and a non-stopping position where the stop pawl permits the releasing movement of the ratchet member.

With the operating device according to the ninth aspect, it is possible to limit a releasing movement of the ratchet member to release only one ratchet position during a releasing operation.

In accordance with a tenth aspect of the present disclosure, the operating device according to the ninth aspect is configured so that the positioning pawl and the stop pawl are pivotally mounted as a single unit to the support structure.

With the operating device according to the tenth aspect, is possible to simplify the construction of the positioning pawl and the stop pawl.

In accordance with an eleventh aspect of the present disclosure, the operating device according to one of the first aspect to the tenth aspect further comprises a second user operating member movably arranged with respect to the support structure between a second non-operated position and a second operated position.

With the operating device according to the eleventh aspect, it is possible for a user to easily perform a pulling operation.

In accordance with a twelfth aspect of the present disclosure, the operating device according to the eleventh aspect is configured so that the second user operating member includes a first abutment configured to pivot the first pawl about the first pivot axis in response to the second user operating member being moved from the second non-operated position to the second operated position.

With the operating device according to the twelfth aspect, the first pawl can be reliable disengagement from the ratchet member during the pulling operation.

In accordance with a thirteenth aspect of the present disclosure, the operating device according to the eleventh aspect or the twelfth aspect is configured so that the second user operating member includes a second abutment configured to permit the second pawl to pivot about the second pivot axis towards engagement with the ratchet member in response to the second user operating member being moved from the second non-operated position to the second operated position.

With the operating device according to the thirteenth aspect, the second pawl can be reliable moved into engagement with the ratchet member during the pulling operation.

In accordance with a fourteenth aspect of the present disclosure, the operating device according to one of the eleventh aspect to the thirteenth aspect is configured so that the first user operating member is biased towards the first non-operated position, and the second user operating member is biased towards the second non-operated position.

With the operating device according to the fourteenth aspect, the first user operating member can be returned to a ready position after a releasing operation.

In accordance with a fifteenth aspect of the present disclosure, the operating device according to one of the eleventh aspect to the fourteenth aspect is configured so that the first user operating member and the second user operating member are pivotally mounted with respect to the support structure about a common mounting axis that is offset from the first pivot axis and the second pivot axis.

With the operating device according to the fifteenth aspect, the operating device can be made to be relatively simple and relatively compact while still making the operating device robust.

In accordance with a sixteenth aspect of the present disclosure, the operating device according to one of the eleventh aspect to the fourteenth aspect is configured so that the second user operating member includes a contact surface configured to move the first user operating member as the second user operating member moves from the second non-operated position towards the second operated position.

With the operating device according to the sixteenth aspect, it is possible to reduce the costs of manufacturing the operating device by having the first pawl and the second pawl pivotally supported on the first user operating member while also making the operating device robust.

In accordance with a seventeenth aspect of the present disclosure, the operating device according to one of the eleventh aspect to the fourteenth aspect is configured so that the second user operating member is configured to remain stationary as the first user operating member moves from the first non-operated position towards the first operated position.

With the operating device according to the seventeenth aspect, the operating device can be made to be relatively simple and relatively compact.

In accordance with an eighteenth aspect of the present disclosure, the operating device according to one of the first aspect to the seventeenth aspect further comprises a take-up member provided to the ratchet member.

With the operating device according to the eighteenth aspect, it is possible to operate a cable operated component with the operating device.

In accordance with a nineteenth aspect of the present disclosure, the operating device according to the eighteenth aspect is configured so that the take-up member and the ratchet member are biased in the releasing direction with respect to the support structure.

With the operating device according to the nineteenth aspect, it is possible to reliable release the cable from the operating device.

In accordance with a twentieth aspect of the present disclosure, the operating device according to one of the first aspect to the nineteenth aspect further comprises a handlebar attachment coupled to the support structure.

With the operating device according to the twentieth aspect, it is possible to attach the operating device to a handlebar to improve the operability of the operating device.

Also, other objects, features, aspects and advantages of the disclosed operating device will become apparent to those skilled in the art from the following detailed description, which, taken in conjunction with the annexed drawings, discloses preferred embodiments of the operating device.

BRIEF DESCRIPTION OF THE DRAWINGS

Referring now to the attached drawings which form a part of this original disclosure, an illustrative embodiment is shown.

DETAILED DESCRIPTION

Figure 1:
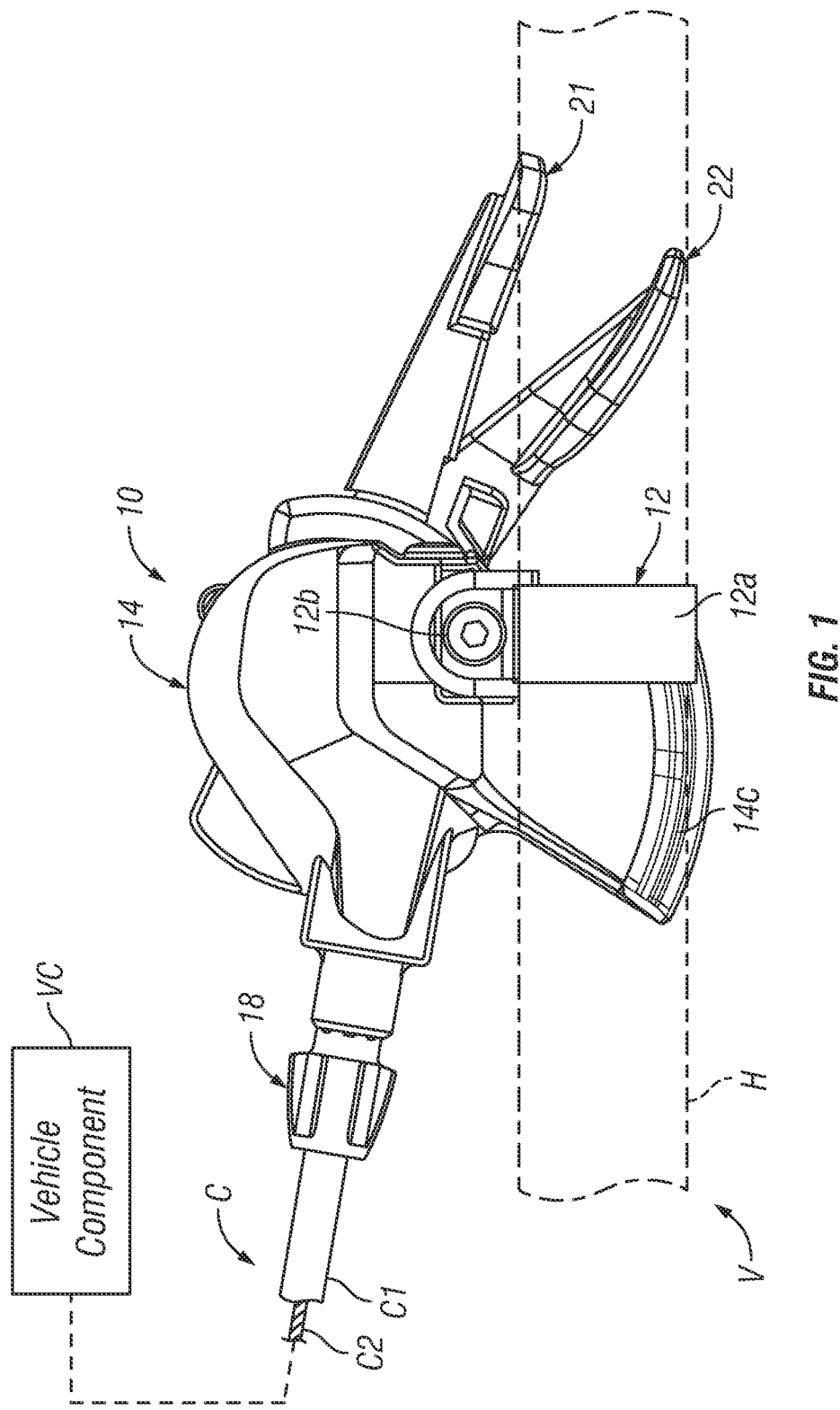
FIG. 1 is a top plan view of a portion of a handlebar of a human-powered vehicle (e.g., a bicycle) equipped with an operating device in accordance with one illustrative embodiment in which a first user operated member and a second user operated member are in rest or non-operated positions.

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Referring initially to FIGS. 1 to 6, an operating device 10 is provided for a human-powered vehicle V for operating a vehicle component VC. In particular, a portion of a handlebar H of the human-powered vehicle V is shown that is equipped with the operating device 10 in accordance with one illustrative embodiment. Here, the human-powered vehicle V is a bicycle and the operating device 10 is a bicycle operating device that is particularly configured for a rear derailleur. However, the operating device 10 can be used for positioning other types of vehicle or bicycle component other than a rear derailleur of a bicycle.

In the illustrated embodiment, the operating device 10 is configured as a gear shifter for controlling a gear position of a gear changing device (a bicycle component such as a derailleur or an internally geared hub. However, the operating device 10 can be used as a bicycle control device for operating other types of bicycle components (e.g., a suspension, an adjustable seatpost, etc.) as needed and/or desired. In the illustrated embodiment, as explained below, the operating device 10 has a plurality of predetermined steps or positions. When the vehicle component VC is a rear derailleur, the predetermined steps or positions of the operating device 10 correspond to gear positions of the rear derailleur.

Here, as seen in FIGS. 1 to 6, the operating device 10 further comprises a handlebar attachment 12. The operating device 10 is arranged, for example, on a right side of the handlebar H by the handlebar attachment 12 so as to be operated by a rider's right hand. Alternatively, the operating device 10 can be constructed as a mirror image and arranged on a left side of the handlebar H. While the handlebar H is a flat handlebar (MTB handlebar) in the illustrated embodiment, the operating device 10 can be configured to be mounted to other types of handlebars such as a drop handlebar (Road handlebar). The handlebar attachment 12 is configured to be mounted to the handlebar H in a conventional manner. The handlebar attachment 12 is preferably made of a strong rigid material such as a metallic material or a reinforced resin material.

As seen in FIGS. 1, 4 to 6 and 9, here, the handlebar attachment 12 has a handlebar clamp 12a and a tightening bolt 12b for tightening the handlebar clamp 12a around the handlebar H. While the handlebar clamp 12a is shown as a one-piece, unitary member (i.e., a non-hinged clamp), the handlebar clamp 12a can be a hinged clamp having a pair of curved jaws pivotally connected at one end and adjustably coupled by the tightening bolt 12b at the other end.

In the illustrated embodiment, as seen in FIGS. 1 to 6, the operating device 10 is configured to be operatively coupled to the vehicle (bicycle) component VC via a control cable C. Preferably, the control cable C is a conventional bicycle operating cable that has an outer case C1 covering an inner wire C2. In other words, the control cable C is a Bowden type cable in which the inner wire C2 is slidably received within the outer case C1. The inner wire C2 has a cable nipple or attachment barrel for attaching the inner wire C2 to the operating device 10 in a conventional manner as discussed below. The operating device 10 operates the vehicle component VC by selectively pulling and releasing the inner wire C2. Thus, the operating device 10 constitutes a bicycle cable operating device.

Figure 3:
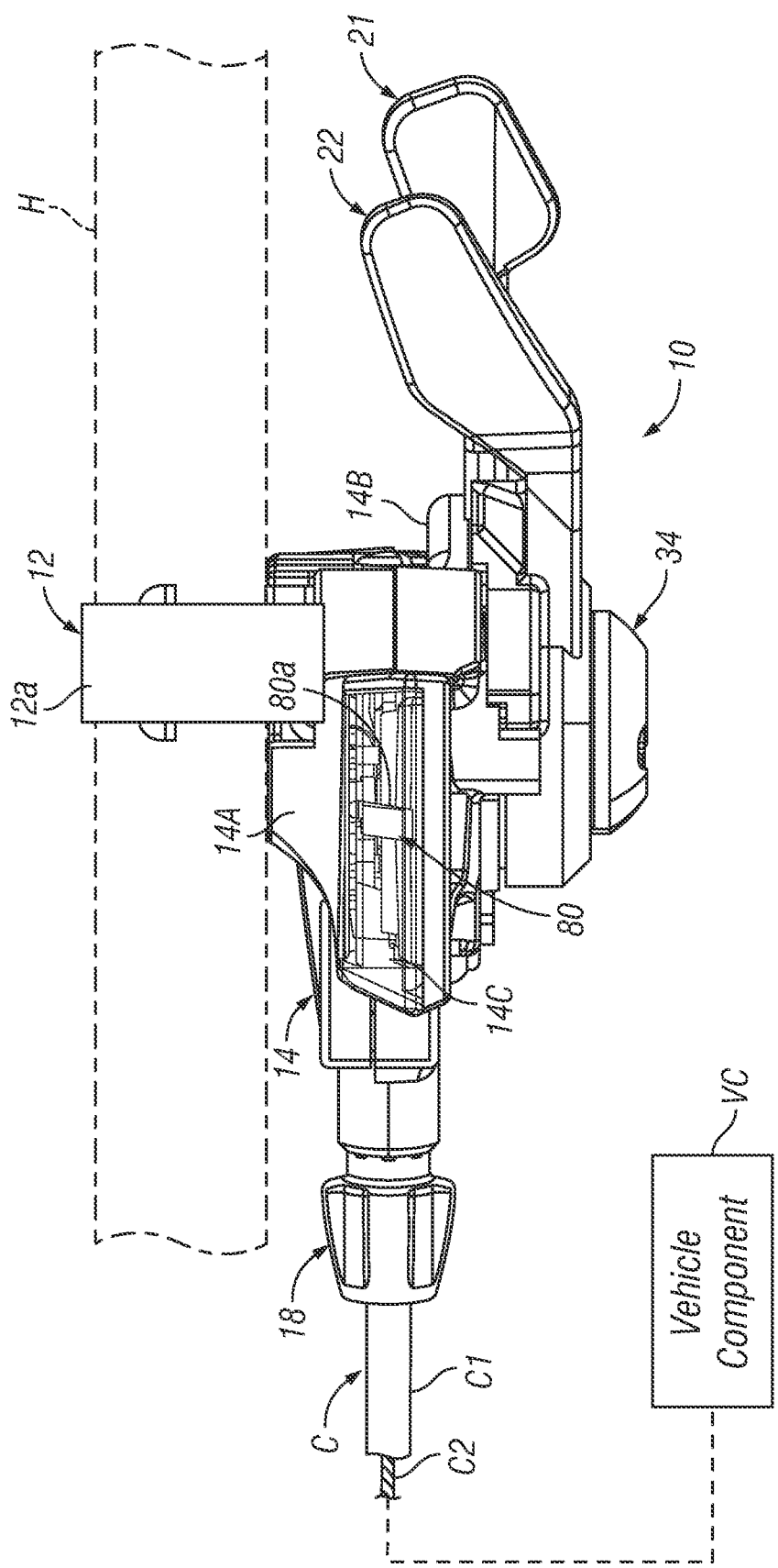
FIG. 3 is a side elevational view of the operating device coupled to the handlebar as illustrated in FIGS. 1 and 2.
Figure 9:
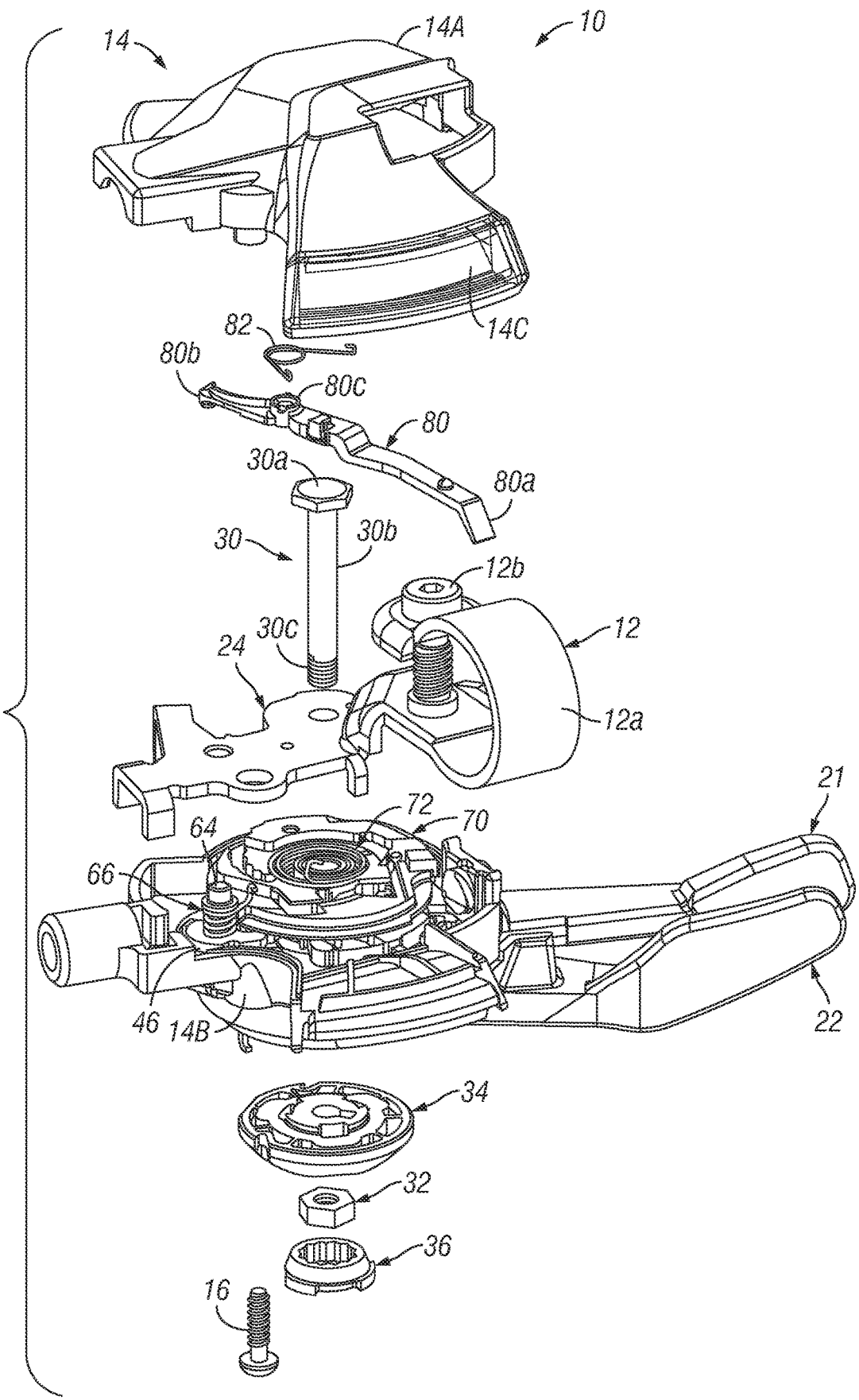
FIG. 9 is a partially exploded perspective view of the operating device illustrated in FIGS. 1 to 6 to reveal the internal parts of the operating device.

Here, the operating device 10 comprises a housing 14 in which the inner wire C2 of the control cable C is pulled into and releases from. The housing 14 is preferably made of two or more parts that are fastened together for accommodating and protecting the internal parts of the operating device 10. As seen in FIGS. 3 and 9, the housing 14 basically includes a first or upper housing portion 14A and a second or lower housing portion 14B. The first housing portion 14A and the second housing portion 14B are fixedly coupled together by a fastener 16 (e.g., a screw as in the illustrated embodiment). The first housing portion 14A and the second housing portion 14B are hard rigid members that are constructed of a suitable material such as a hard plastic or a lightweight metal such as aluminum. However, the housing 14 is not limited to the illustrated construction, but rather can have a variety of configurations as needed and/or desired. Here, the housing 14 further includes a transparent lens 14C for viewing a current position of the operating device 10. The lens 14C is mounted to the first housing portion 14A and overlies an opening in the first housing portion 14A. The lens 14C is constructed of a suitable material transparent plastic. Since the shape, the size and the materials of the housing 14 can be practically any suitable shape, size and materials, the construction of the housing 14 will not be discussed in further detail herein.

Also, in the illustrated embodiment, the operating device 10 is also provided with a barrel adjuster 18 that projects from the housing 14 for receiving the control cable C. The barrel adjuster 18 is configured to adjust a contact point of an end of the outer case C1 relative to the housing 14 of the operating device 10. The barrel adjuster 18 is a conventional part that is well known in the human-powered vehicle field and will not be discussed in further detail herein.

Figure 2:
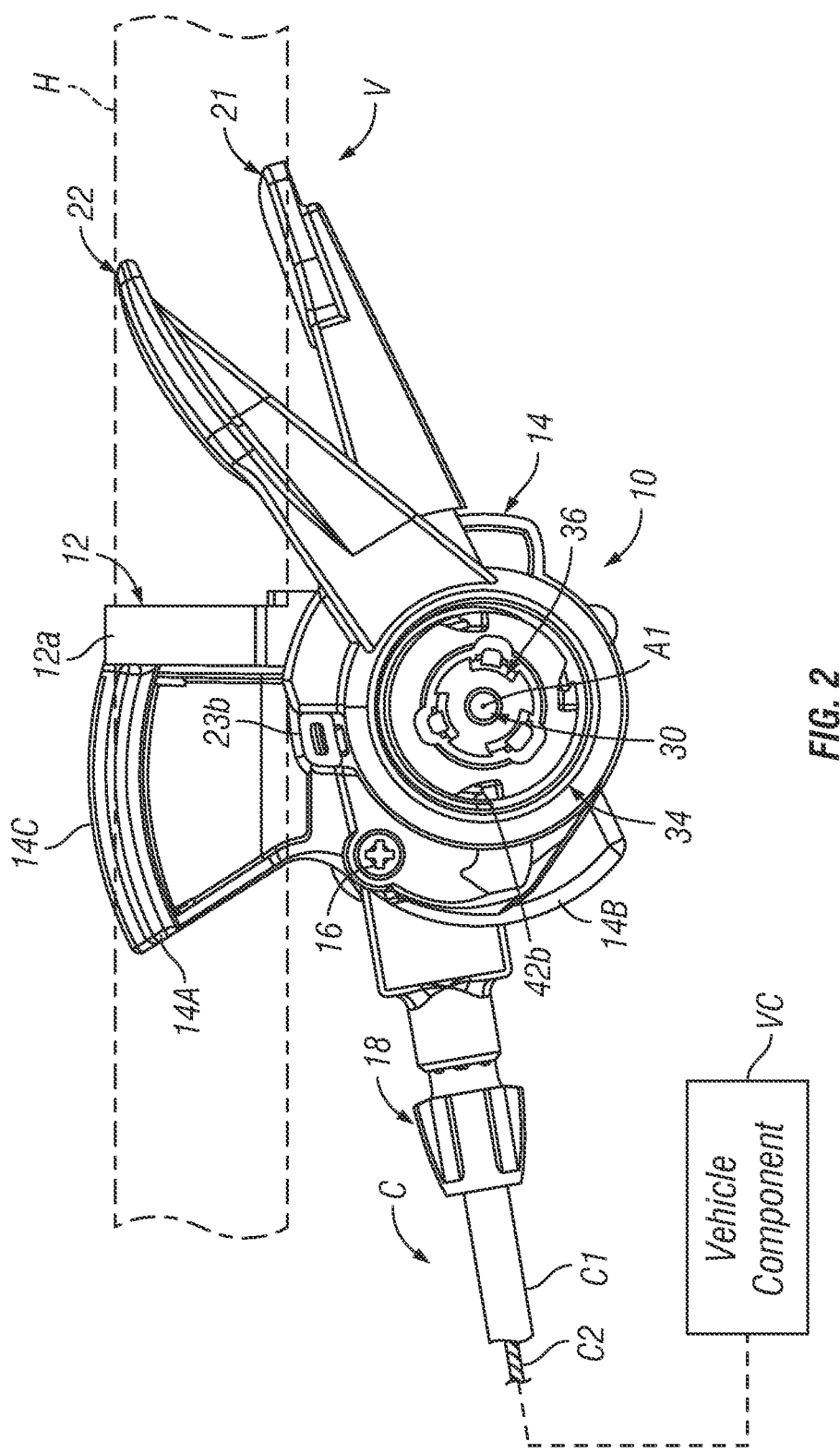
FIG. 2 is a bottom plan view of the operating device coupled to the handlebar as illustrated in FIG. 1.
Figure 4:
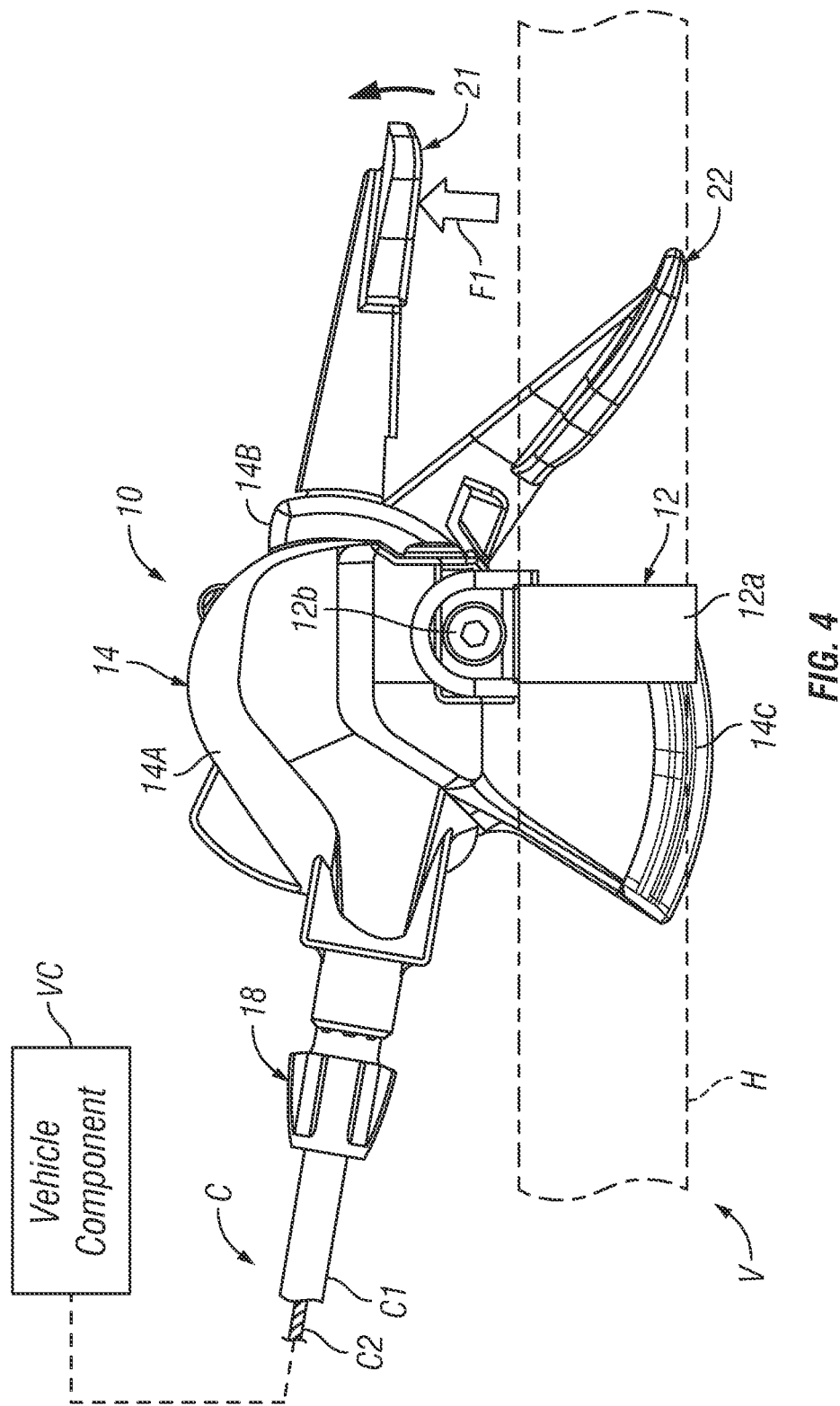
FIG. 4 is a top plan view of the operating device coupled to the handlebar as illustrated in FIGS. 1 to 3, but in which the first user operated member lever has been moved in an operating direction from a first non-operated position to a first operated position to perform a cable releasing operation.

Still referring to FIGS. 1 to 6, the operating device 10 further comprises a first user operating member 21. The first user operating member 21 is configured to be operated by a user to perform a releasing operation. FIGS. 1 to 3 show the first user operating member 21 in a first non-operated position, which is also called a rest position. FIG. 4 shows the first user operating member 21 in a first operated position in which the first user operating member 21 has been moved by a user from the first non-operated position to the first operated position to release the inner wire C2 of the control cable C. In this way, the inner wire C2 can be payed out of the housing 14 in response to operation of the first user operating member 21.

Figure 10:
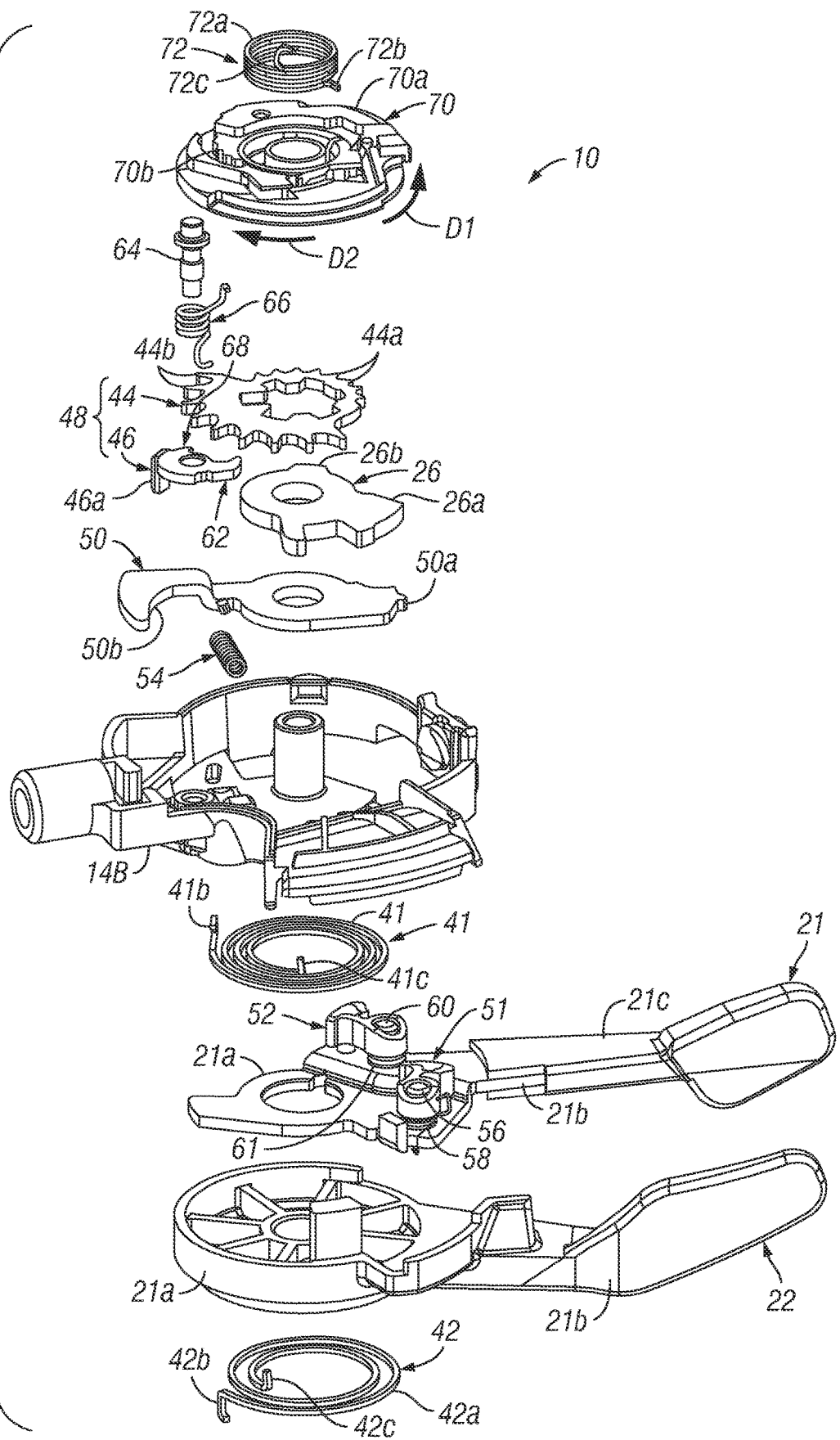
FIG. 10 is a partially exploded perspective view of the selected parts of the operating device illustrated in FIG. 9.
Figure 15:
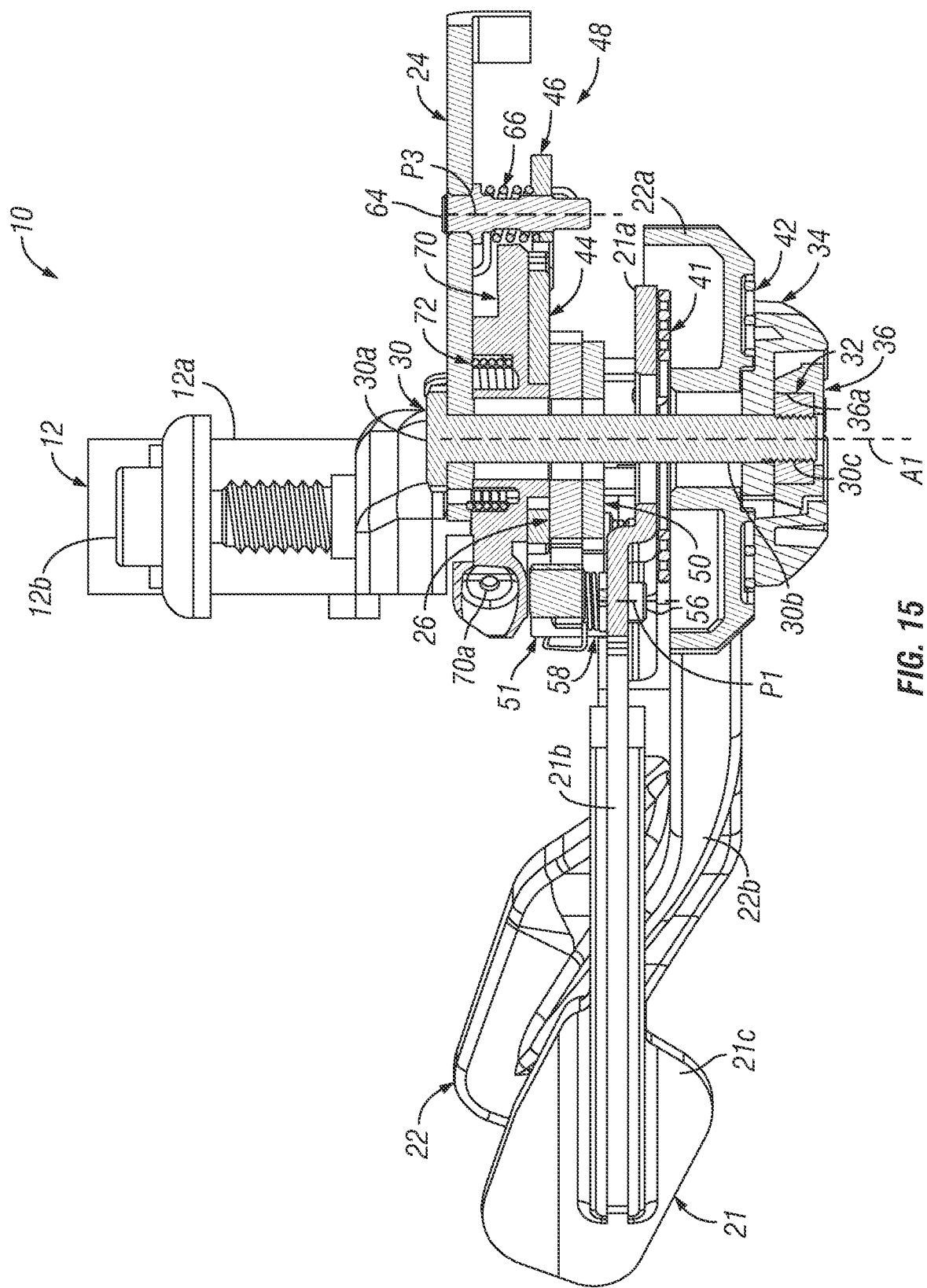
FIG. 15 is a cross sectional view of the selected parts of the operating device illustrated in FIGS. 9 to 14 as seen along a section line including the third pivot axis of the positioning pawl and the mounting axis of the first user operated member and the second user operated member.

Basically, as seen in FIGS. 10 and 15, the first user operating member 21 includes an attachment portion 21a that is disposed inside the housing 14 and a lever portion 21b that extends outside of the housing 14 from the attachment portion 21a. The lever portion 21b is arranged such that the user moves the lever portion 21b to pivot the first user operating member 21 with respect to the support structure 24. The attachment portion 21a and the lever portion 21b are, for example, formed of a single metal piece in which the lever portion 21b has a plastic user contact portion 21c provided to the free end of the lever portion 21b. Thus, the first user operating member 21 can be referred to as a first user operating lever. When performing a releasing operation, a user applies a first pushing force F1 to the lever portion 21b of the first user operating member 21. The first pushing force F1 causes the first user operating member 21 to pivot about the common mounting axis A1 in a first direction D1. As seen in FIGS. 14 to 25, in a top view of the operating device 10, the first direction D1 corresponds to a counterclockwise direction. As explained below, the first direction D1 corresponds to a pulling direction of the operating device 10.

Figure 5:
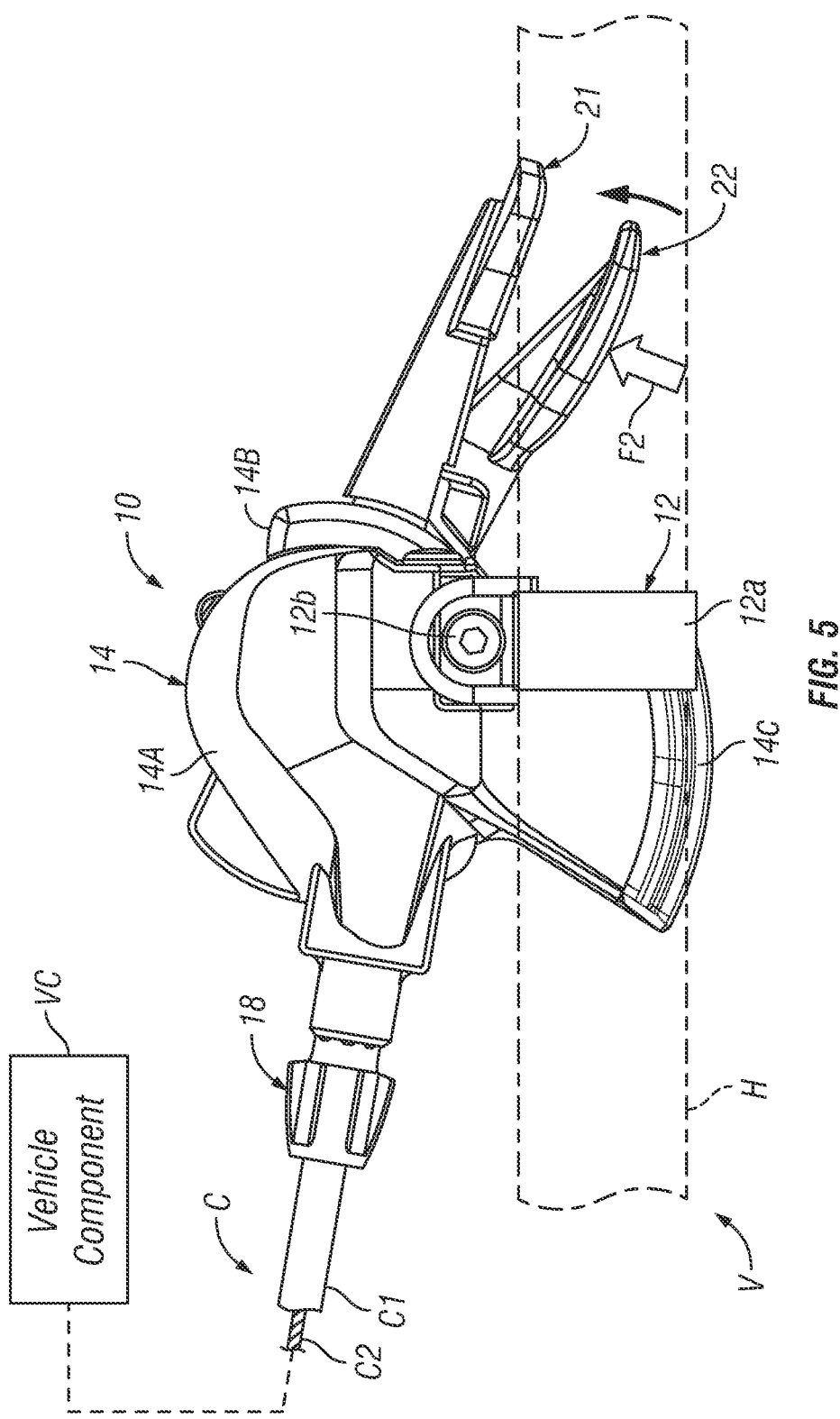
FIG. 5 is a top plan view of the operating device coupled to the handlebar as illustrated in FIGS. 1 to 4, but in which the second user operated member has been moved in the operating direction from a second non-operated position to an intermediate operated position to start perform a cable pulling operation.
Figure 6:
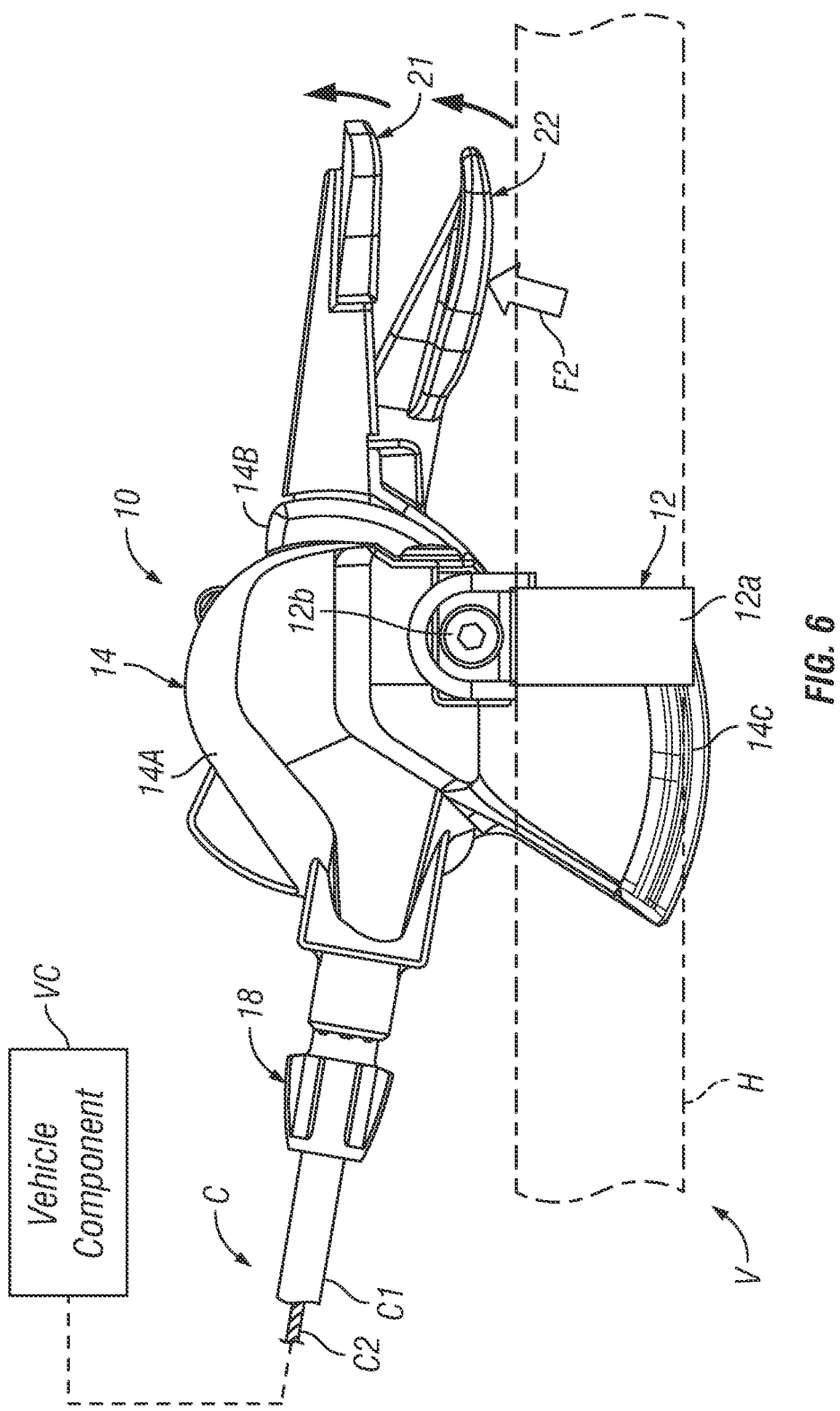
FIG. 6 is a top plan view of the operating device coupled to the handlebar as illustrated in FIGS. 1 to 5, but in which the second user operated member has been moved further in the operating direction from the intermediate operated position of FIG. 5 to a second operated position to perform the cable pulling operation.

The operating device 10 further comprises a second user operating member 22. The second user operating member 22 is configured to be operated by a user to perform a pulling operation. FIGS. 1 to 3 show the second user operating member 22 in a second non-operated position, which is also called a rest position. FIG. 5 shows the second user operating member 22 in an intermediate operated position in which the second user operating member 22 contacts the first user operating member 21. FIG. 6 shows the second user operating member 22 in the second operated position in which the second user operating member 22 has been moved by a user from the second non-operated position of FIGS. 1 to 3 to the second operated position to pull the inner wire C2 of the control cable C. In this way, the inner wire C2 can be pulled into the housing 14 in response to operation of the second user operating member 22.

Referring to FIGS. 10 and 15, the second user operating member 22 includes an attachment portion 22a that is disposed beneath the housing 14 and a lever portion 22b that extends outwardly from the housing 14 from the attachment portion 22a. The lever portion 22b is arranged such that the user moves the lever portion 22b to pivot the second user operating member 22 with respect to the support structure 24. The attachment portion 22a and the lever portion 22b are, for example, formed of a single rigid plastic material. Thus, the second user operating member 22 can be referred to as a second user operating lever. When performing a pulling operation, a user applies a second pushing force F2 to the lever portion 22b of the second user operating member 22. The second pushing force F2 causes the second user operating member 22 to pivot about the common mounting axis A1 in the first direction D1.

Figure 7:
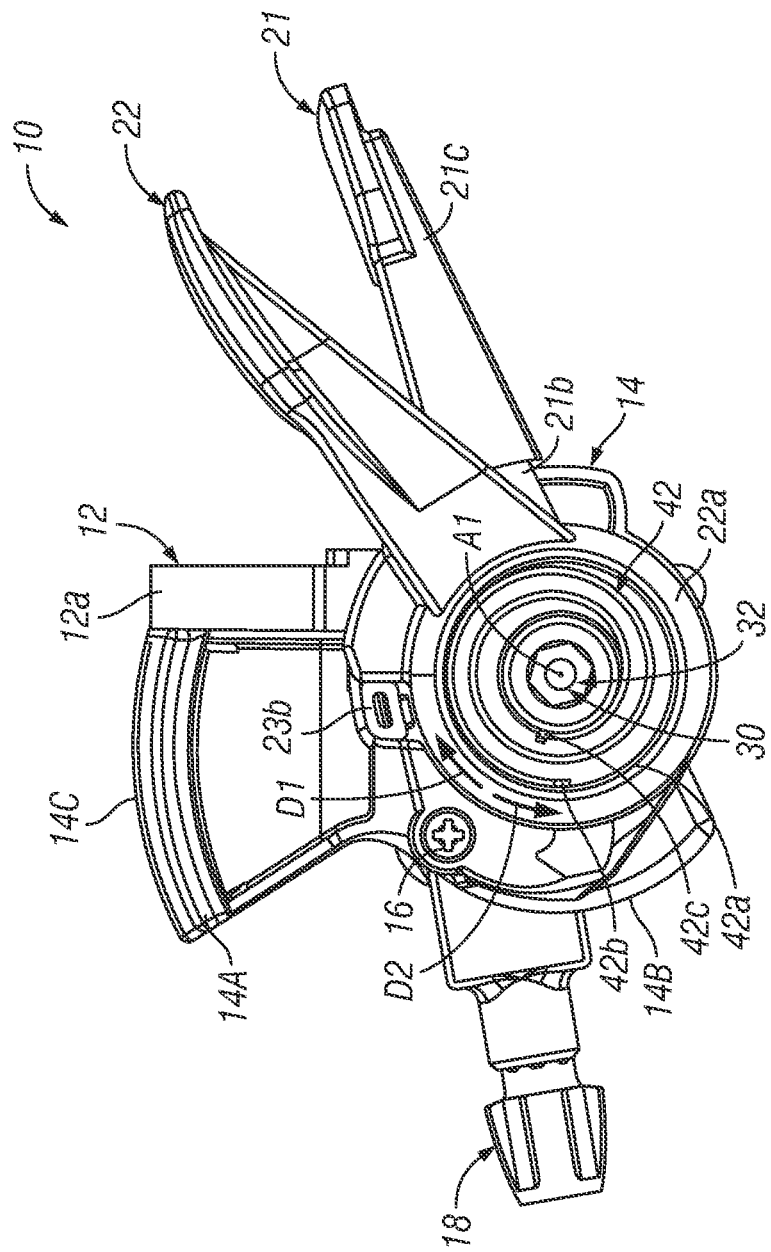
FIG. 7 is a bottom plan view of the operating device illustrated in FIGS. 1 to 6, but in which a fixed member and a nut retainer have been removed to show a biasing member of the second user operated member.
Figure 8:
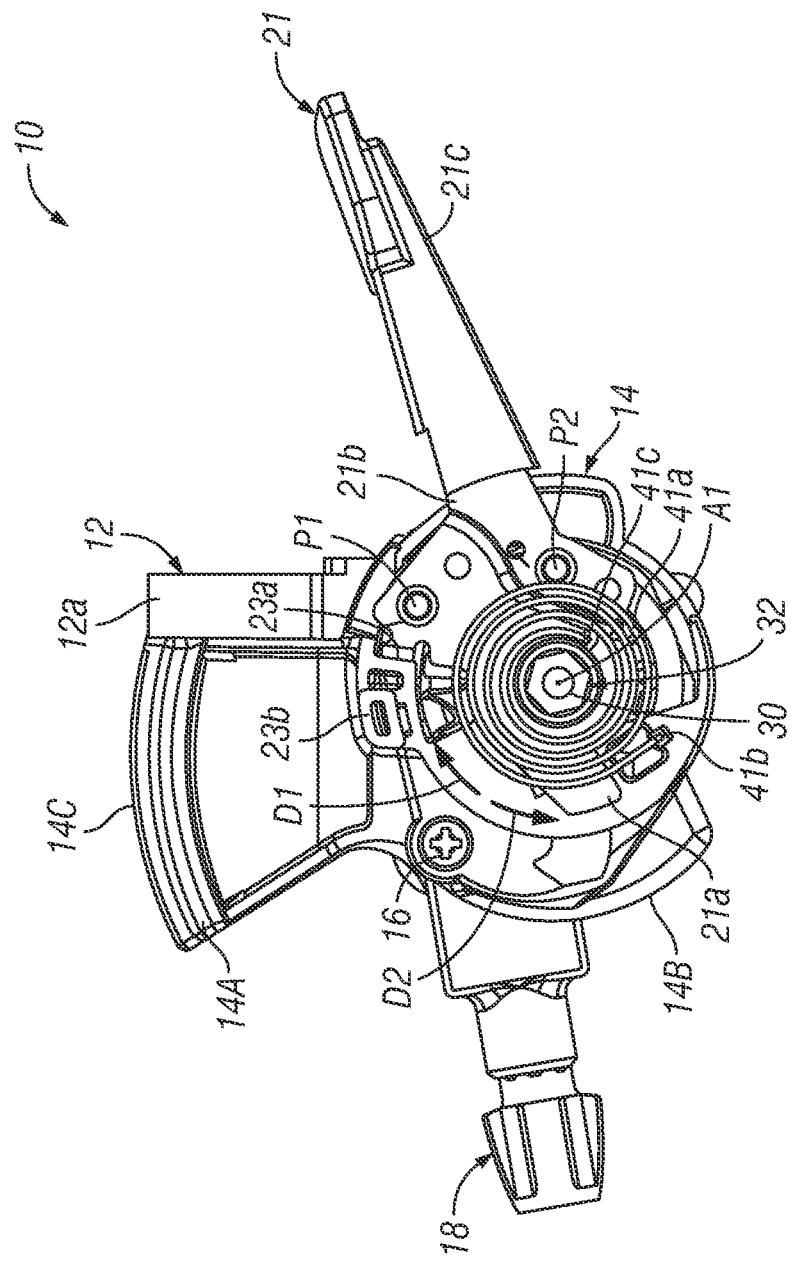
FIG. 8 is a bottom plan view of the operating device illustrated in FIGS. 1 to 6, but in which the second user operated member, the fixed member and the nut retainer have been removed to show a biasing member of the first user operated member.

The term "rest position" as used herein refers to a state in which a part (e.g., the first user operating member 21) remains stationary without the need of a user holding the part in that state. On the other hand, the terms "operated position" and "actuated position" as used herein refers to a temporary state in which a part (e.g., the first user operating member 21 and/or the second user operating member 22) temporarily held in a position due to an external force being inputted into the operating device 10. Here, in the illustrated embodiment, the operating device 10 is configured to operate the vehicle component VC by selectively releasing and pulling the inner wire C2. Thus, the releasing operation can also be referred to as a cable releasing operation and the pulling operation can also be referred to as a cable pulling operation. As seen in FIG. 8, the first user operating member 21 contacts a first abutment 23a to establish the first non-operated position (the first rest position) of the first user operating member 21. Here, the first abutment 23a is integrally formed as part of the second housing portion 14B. As seen in FIG. 7, the second user operating member 22 contacts a second abutment 23b to establish the second non-operated position (the second rest position) of the second user operating member 22.

As seen in FIGS. 7 to 15, the operating device 10 further comprises a support structure 24. Basically, in a state where the operating device 10 is fixed to the handlebar H, the support structure 24 is a stationary part with respect to the handlebar H. The housing 14 is fixed to the support structure 24 by the fastener 16 that couple the first housing portion 14A and the second housing portion 14B together. Basically, the support structure 24 is sandwiched between the first housing portion 14A and the second housing portion 14B. In this way, the housing 14 and the support structure 24 are fixed together.

Here, as seen in FIG. 9, the handlebar attachment 12 is coupled to the support structure 24. More specifically, in the illustrated embodiment, the handlebar clamp 12a is integrally formed with the support structure 24. Alternatively, the handlebar clamp 12a can be attached to the support structure 24 by a fastener such as a bolt or rivet. The support structure 24 is a rigid member that is made of a suitable material such as metallic material or a reinforced composite material. For example, as in the illustrated embodiment, the support structure 24 is metal plate that has been bent to the illustrated shapes. Alternatively, the support structure 24 can be formed in other ways from other types of rigid materials. The support structure 24 supports the internal parts of the operating device 10. Preferably, the first user operating member 21 and the second user operating member 22 are pivotally mounted with respect to the support structure 24 about a common mounting axis A1.

Referring back to FIGS. 1 to 4, the first user operating member 21 is movably supported with respect to the support structure 24 from the first non-operated position (FIGS. 1 to 3) to the first operated position (FIG. 4). In other words, the first user operating member 21 is movably supported on the support structure 24 for selectively operating the selectively pulling the inner wire C2 of the control cable C. The first user operating member 21 is pivotally arranged with respect to the support structure 24 from a first rest position (FIGS. 1 to 3) to the first operated position (FIG. 4) to perform a releasing operation. Thus, the first user operating member 21 can be referred to as a pulling member or lever. The second user operating member 22 is configured to remain stationary as the first user operating member 21 moves from the first non-operated position towards the first operated position.

Referring to FIGS. 1 to 3 and 6, the second user operating member 22 is movably arranged with respect to the support structure 24 between the second non-operated position (FIGS. 1 to 3) and the second operated position (FIG. 6). In other words, the second user operating member 22 is movably supported on the support structure 24 for selectively operating the selectively releasing the inner wire C2 of the control cable C. The second user operating member 22 is pivotally arranged with respect to the support structure 24 from a second rest position (FIGS. 1 to 3) to the second operated position (FIG. 6) to perform a pulling operation. Thus, the second user operating member 22 can be referred to as a pulling member or pulling lever.

Referring to FIGS. 5 and 6, the second user operating member 22 is operated by a user to perform a pulling operation. Initially, the second user operating member 22 is configured to move independently of the first user operating member 21 from the second rest position (FIGS. 1 to 3) to an intermediate operated position (FIG. 5). More specifically, the second user operating member 22 is moved by a user from the second rest position (FIGS. 1 to 3) to an intermediate operated position (FIG. 5) where the first user operating member 21 remains stationary with respect to the second user operating member 22 and the support structure 24. Then, further movement of the second user operating member 22 by a user moves the first user operating member 21 as seen in FIG. 6. Thus, the first user operating member 21 is moved by the second user operating member 22 during a pulling operation.

Figure 16:
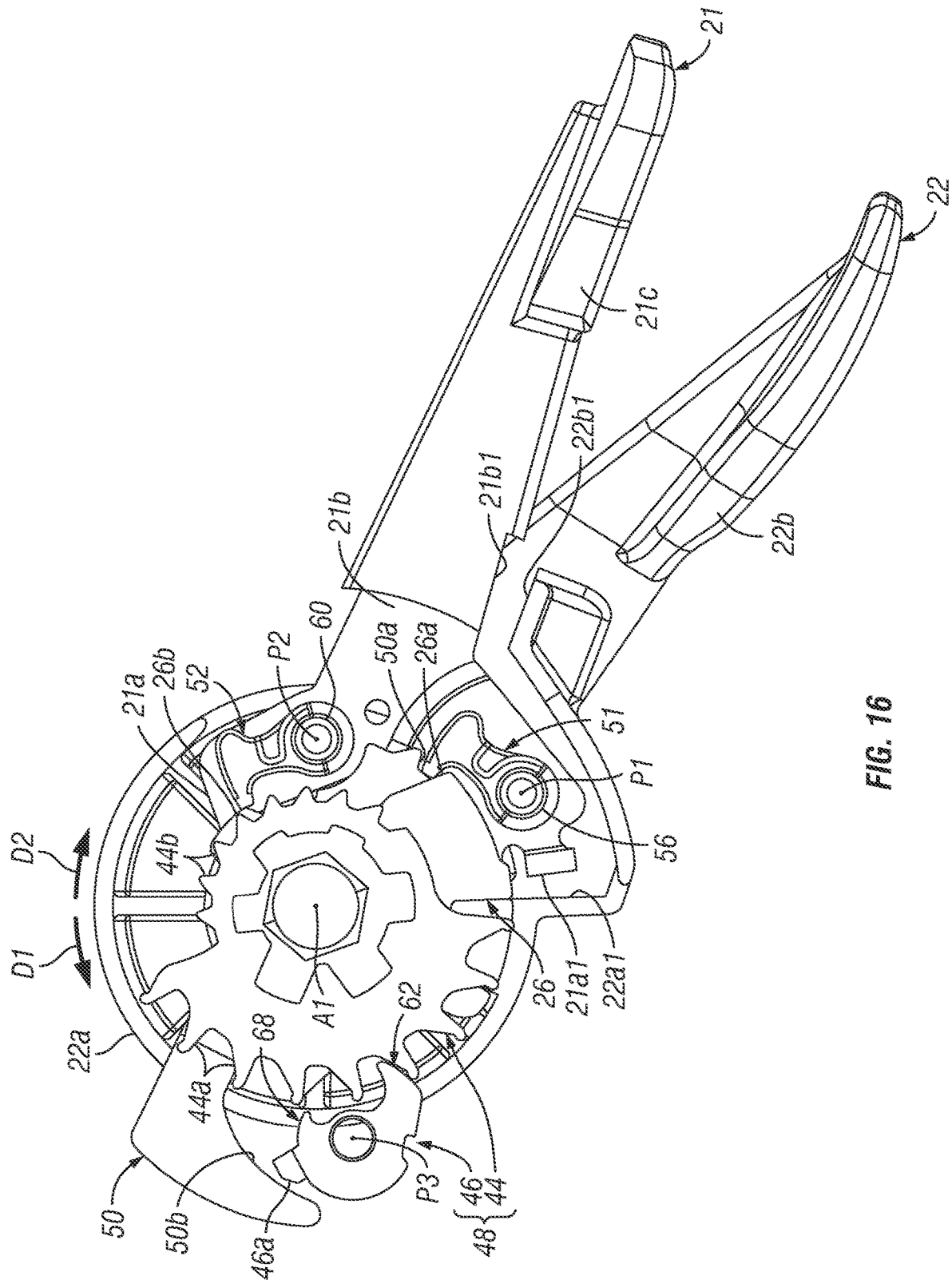
FIG. 16 is a top view of a positioning mechanism and the first user operated member and the second user operated member of the operating device illustrated in FIGS. 1 to 6 in which the first user operated member and the second user operated member are in their rest or non-operated positions.
Figure 17:
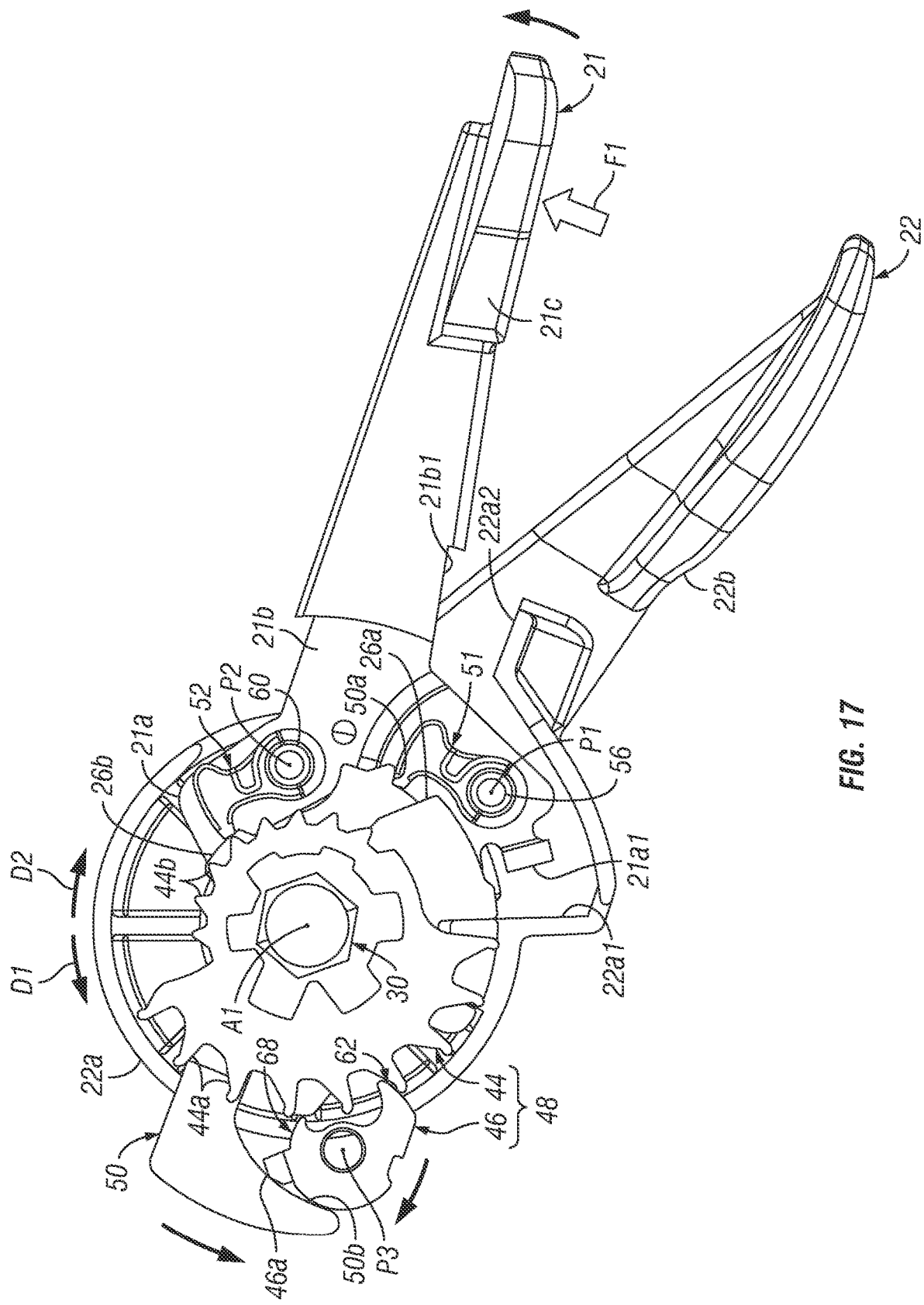
FIG. 17 is a top view of the positioning mechanism and the first user operated member and the second user operated member illustrated in FIG. 16, but in which the first user operated member has been slightly moved towards the first operated position to start a cable releasing operation where the release member starts to move from the first position towards the second position.

Referring to FIGS. 10, 15 and 16, the second user operating member 22 further comprises an abutment member 26. Here, the abutment member 26 is a rigid plate such as a metal plate. The abutment member 26 is non-rotationally fixed to the attachment portion 22a of the second user operating member 22. Thus, the abutment member 26 pivots about the common mounting axis A1 when the second user operating member 22 is operated. The second user operating member 22 includes a first abutment 26a. Here, the first abutment 26a is formed by the abutment member 26. Alternatively, the first abutment 26a can be integrally formed with the attachment portion 22a of the second user operating member 22. The second user operating member 22 further includes a second abutment 26b. Here, the second abutment 26b is formed by the abutment member 26. Alternatively, the second abutment 26b can be integrally formed with the attachment portion 22a of the second user operating member 22. The function of the abutment member 26 of the second user operating member 22 will be explained below.

Referring to FIG. 16, the second user operating member 22 includes a contact surface 22a1 and/or 22b1. The contact surface 22a1, 22b1 is configured to move the first user operating member 21 as the second user operating member 22 moves from the second non-operated position towards the second operated position. Here, in particular, the second user operating member 22 includes a first contact surface 22a1 and a second contact surface 22b1. The first contact surface 22a1 is integrally formed with the attachment portion 22a of the second user operating member 22. The second contact surface 22b1 is integrally formed with the lever portion 22b of the second user operating member 22. The first user operating member 21 includes a first contact surface 21a1 and a second contact surface 21b1. The first contact surface 21a1 is integrally formed with the attachment portion 21a of the first user operating member 21. The second contact surface 21b1 is integrally formed with the lever portion 21b of the first user operating member 21. The first contact surface 22a1 of the second user operating member 22 is configured to contact the first contact surface 21a1 of the first user operating member 21 as the second user operating member 22 moves from the second non-operated position towards the second operated position. Similarly, the second contact surface 22b1 of the second user operating member 22 is configured to contact the second contact surface 21b1 of the first user operating member 21 as the second user operating member 22 moves from the second non-operated position towards the second operated position.

While the second user operating member 22 includes two separate contact surfaces 22a1 and 22b1 for moving the first user operating member 21 as the second user operating member 22 moves from the second non-operated position towards the second operated position, the second user operating member 22 can have a single contact surface (e.g., the first contact surface 22a1 or the second contact surface 22b1).

Referring to FIGS. 9 and 15, the operating device 10 further comprises a fixing bolt 30 and a fixing nut 32. Basically, the fixing bolt 30 has a head portion 30a and a shaft portion 30b. The shaft portion 30b is provided with an external thread 30c. The fixing nut 32 is screwed onto the external thread 30c of the shaft portion 30b. The first user operating member 21 and the second user operating member 22 are pivotally mounting to the support structure 24 by the fixing bolt 30. Thus, the fixing bolt 30 defines the common mounting axis A1 of the first user operating member 21 and the second user operating member 22. In particular, the attachment portion 21a of the first user operating member 21 is pivotally mounted to the fixing bolt 30. Likewise, the attachment portion 22a of the second user operating member 22 is pivotally mounted to the fixing bolt 30. Here, the fixing bolt 30 is a separate part from the second user operating member 22. Alternatively, the second user operating member 22 can be integrates with the fixing bolt 30 and/or abutment member 26 as needed and/or desired.

Here, the operating device 10 further comprises a fixed member 34 and a nut retainer 36 that can be provided to prevent rotation of the fixing nut 32 with respect to the support structure 24. In particular, the fixed member 34 is keyed to the second housing portion 14B so that the fixed member 34 is non-movably coupled to the second housing portion 14B. As seen in FIG. 15, the nut retainer 36 has a recess 36a that is sized to non-rotatable receive the fixing nut 32. The nut retainer 36 is snap-fitted to the fixed member 34 such that the fixing nut 32 is sandwiched between the fixed member 34 and the nut retainer 36. By screwing the fixing bolt 30 into the fixing nut 32, the fixed member 34 and the nut retainer 36 are fixed to the second housing portion 14B. Also, by screwing the fixing bolt 30 into the fixing nut 32, the first user operating member 21 and the second user operating member 22 are pivotally mounted with respect to the support structure 24 about the common mounting axis A1.

Referring to FIGS. 8, 10 and 15, the first user operating member 21 is biased towards the first non-operated position. In particular, the operating device 10 further comprises a first biasing member 41. As seen in FIG. 8, the first user operating member 21 is biased against the first abutment 23a by the first biasing member 41 to establish the first non-operated position. Thus, the first biasing member 41 biases the first user operating member 21 in a second direction D2 towards the first non-operated position. The second direction D2 is opposite to the first direction D1 with respect to the common mounting axis A1. As seen in FIGS. 16 to 27, in a top view of the operating device 10, the second direction D2 corresponds to a clockwise direction. As explained below, the second direction D2 corresponds to a releasing direction of the operating device 10. Thus, the pulling direction D1 is different from the releasing direction D2.

The first biasing member 41 is operatively disposed between the second housing portion 14B and the attachment portion 21a of the first user operating member 21. Here, for example, the first biasing member 41 is a flat torsion spring that is disposed between the second housing portion 14B and the attachment portion 21a of the first user operating member 21. The first biasing member 41 has a coiled portion 41a that is spirally arranged around the fixing bolt 30. The first biasing member 41 has a first end 41b coupled to the second housing portion 14B and a second end 41c coupled to the attachment portion 21a of the first user operating member 21. In this way, the first user operating member 21 is biased towards the first non-operated position. Preferably, the first biasing member 41 is preloaded where the first user operating member 21 is in the first non-operated position (FIG. 16).

Referring to FIGS. 7, 10 and 15, the second user operating member 22 is biased towards the second non-operated position. In particular, the operating device 10 further comprises a second biasing member 42. As seen in FIG. 7, the second user operating member 22 is biased against the second abutment 23b by the second biasing member 42 to establish the second non-operated position. The second biasing member 42 biases the second user operating member 22 in the second direction D2 towards the second non-operated position.

The second biasing member 42 is operatively disposed between the fixed member 34 and the attachment portion 22a of the second user operating member 22. Here, for example, the second biasing member 42 is a flat torsion spring that is disposed between the fixed member 34 and the attachment portion 22a of the second user operating member 22. The second biasing member 42 has a coiled portion 42a that is spirally arranged around the fixing bolt 30. The second biasing member 42 has a first end 42b coupled to the fixed member 34 and a second end 42c coupled to the attachment portion 22a of the second user operating member 22. In this way, the second user operating member 22 is biased towards the second non-operated position. Preferably, the second biasing member 42 is preloaded where the second user operating member 22 is in the second non-operated position (FIG. 16).

Referring now to FIGS. 10 to 16, the operating device 10 comprises a ratchet member 44 and a positioning member 46. Basically, the ratchet member 44 and the positioning member 46 form a positioning mechanism 48 of the operating device 10. The ratchet member 44 is movably supported with respect to the support structure 24 between a plurality of predetermined positions. More specifically, the ratchet member 44 is pivotally arranged with respect to the support structure 24 between a plurality of predetermined positions. The positioning member 46 is selectively engaged with the ratchet member 44 to selectively establish the predetermined positions. The ratchet member 44 is configured to be moved in the second direction D2 in response to a releasing operation of the first user operating member 22. Also, the ratchet member 44 is configured to be moved in the first direction D1 in response to a pulling operation of the second user operating member 22 in the first direction D1.

Figure 11:
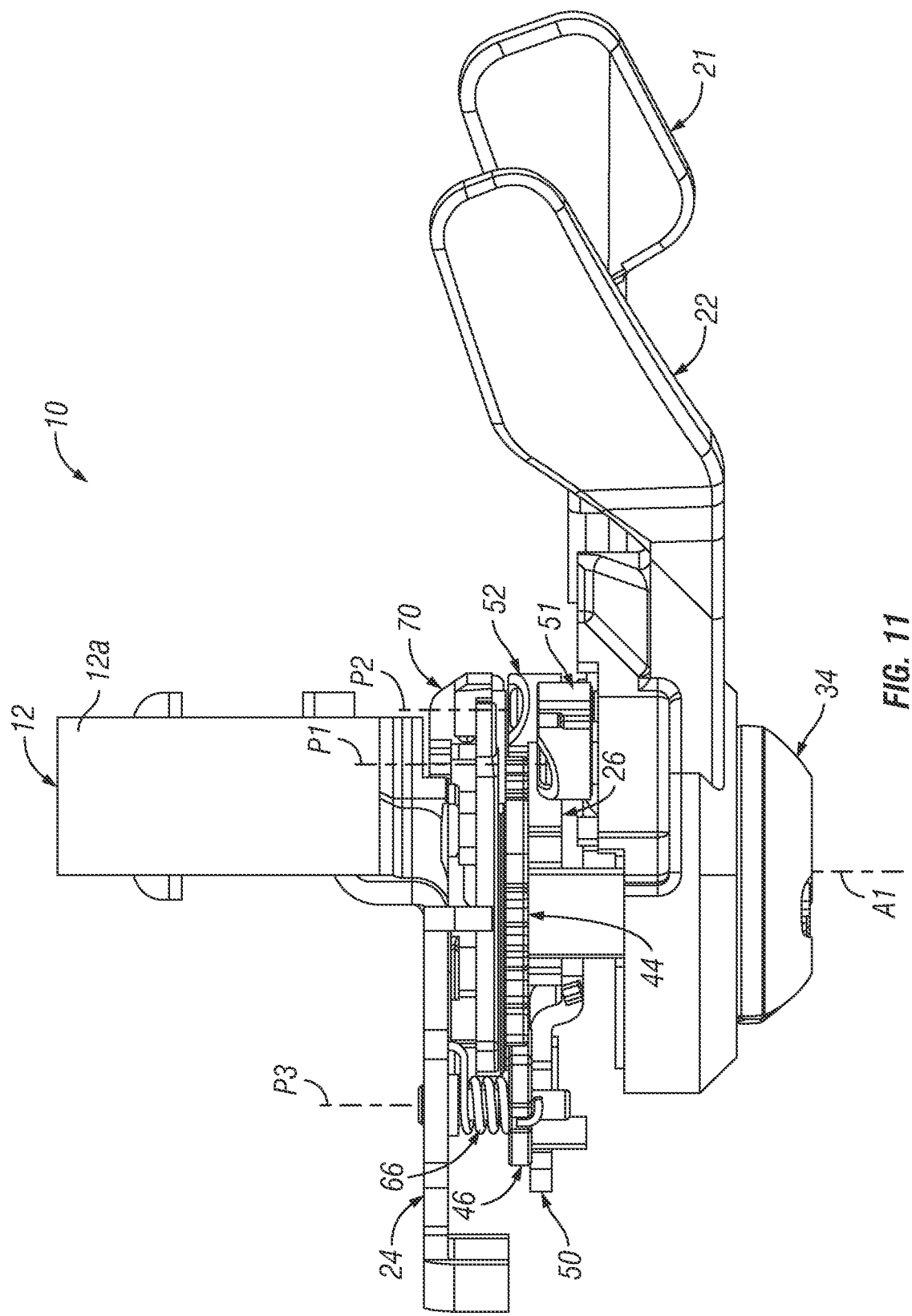
FIG. 11 is a rear side elevational view of the selected parts of the operating device illustrated in FIGS. 1 to 6.
Figure 12:
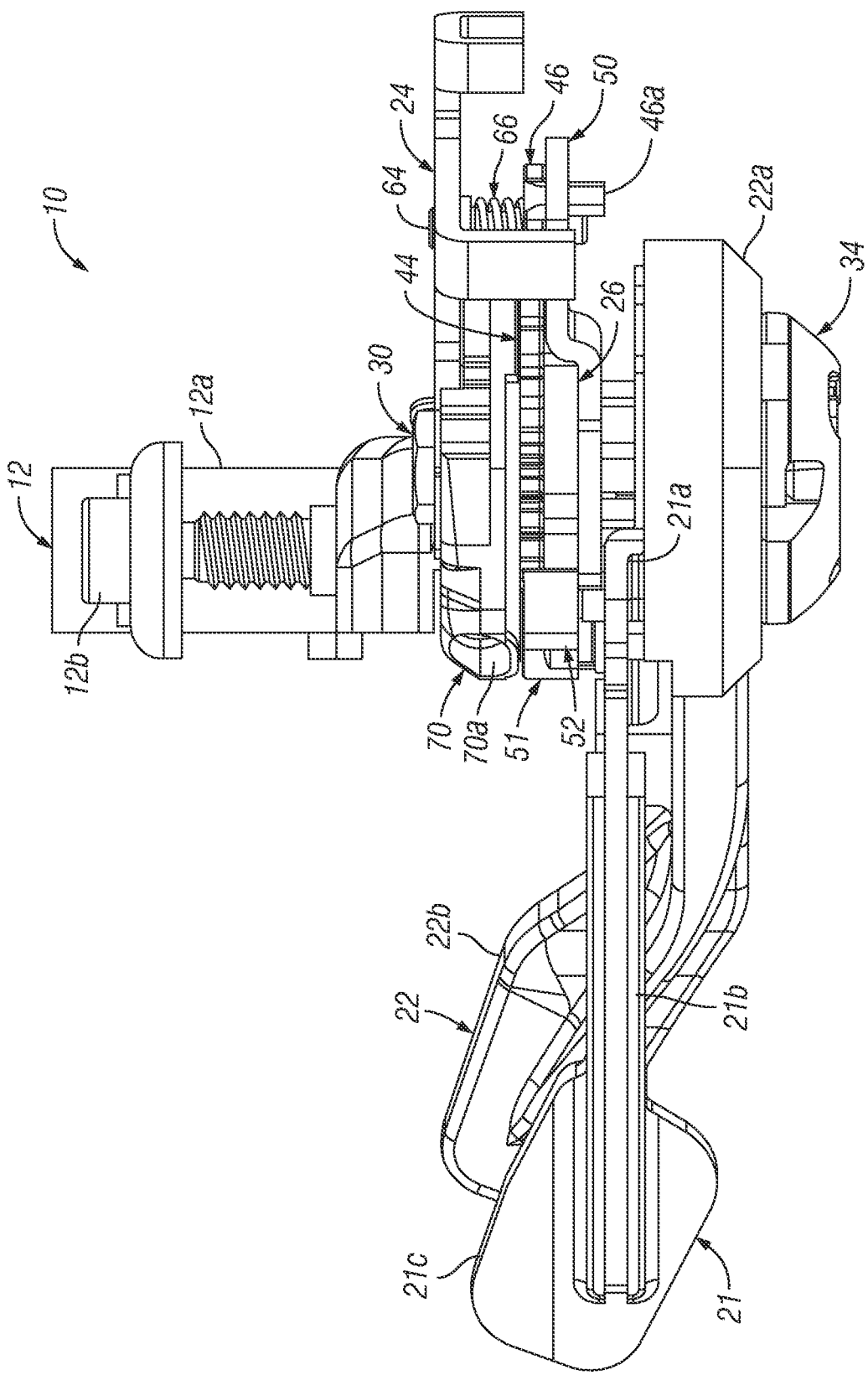
FIG. 12 is a front side elevational view of the selected parts of the operating device illustrated in FIG. 11.
Figure 13:
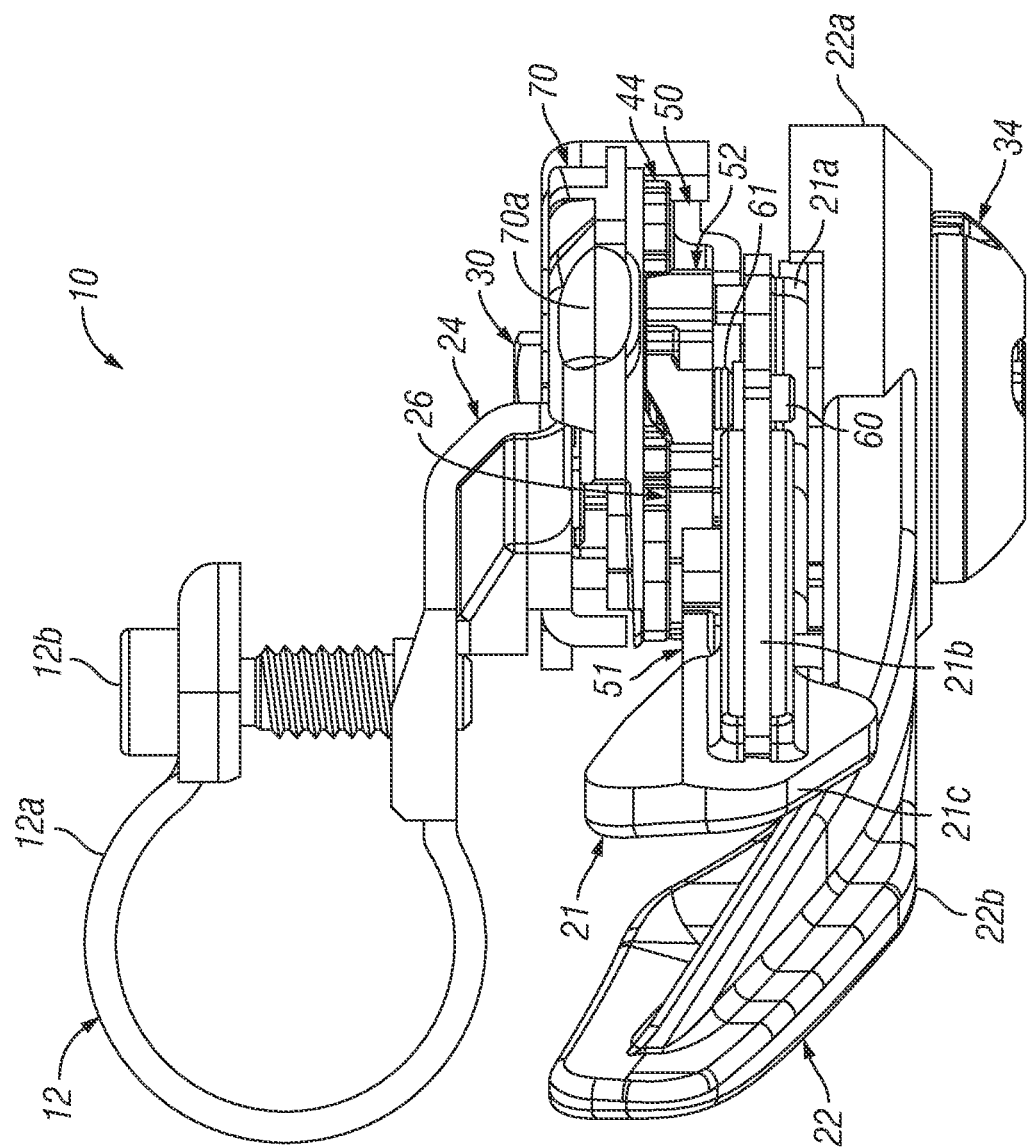
FIG. 13 is an outer side elevational view of the selected parts of the operating device illustrated in FIGS. 11 and 12.
Figure 14:
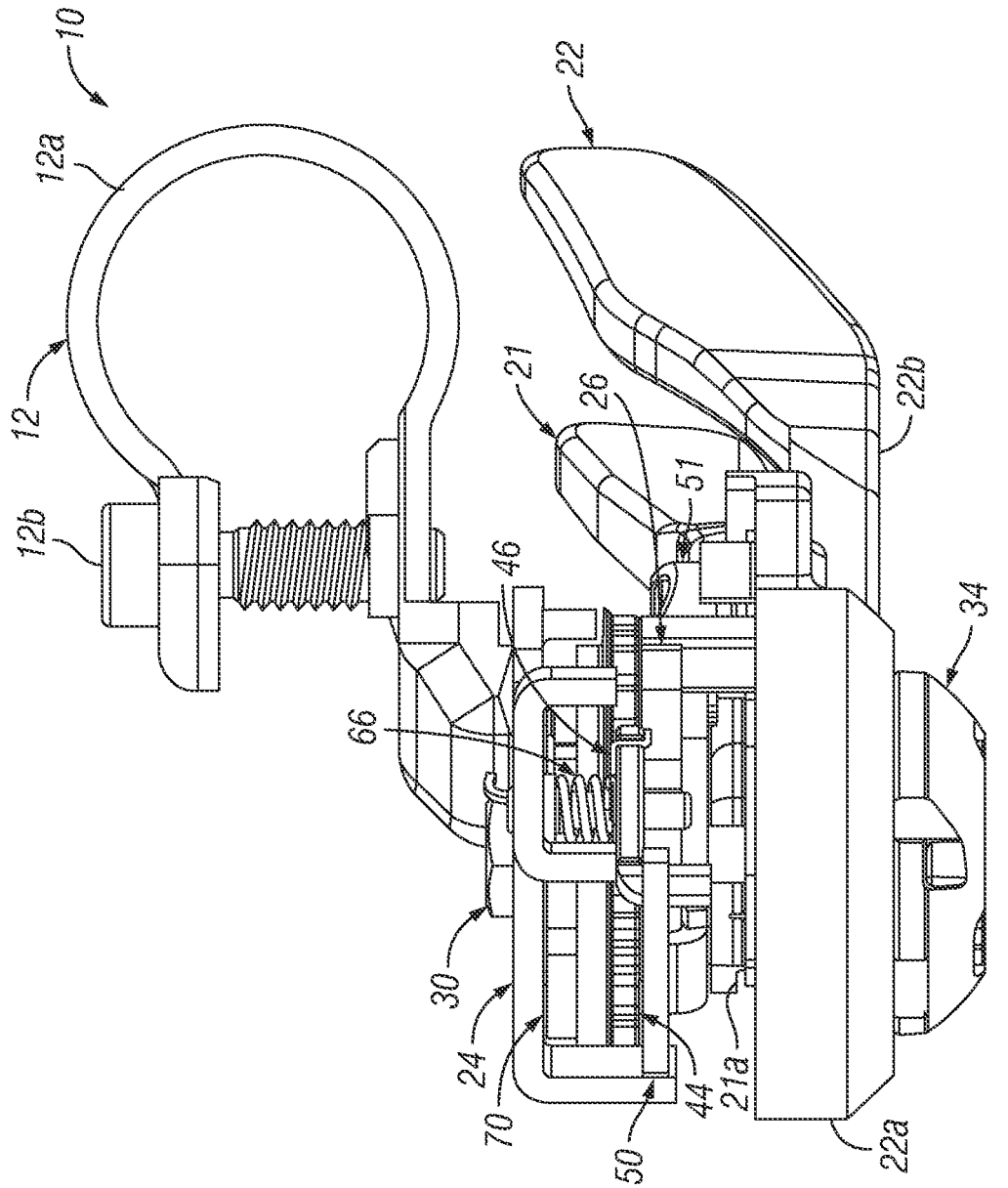
FIG. 14 is an inner side elevational view of the selected parts of the operating device illustrated in FIGS. 11 to 13.
Figure 19:
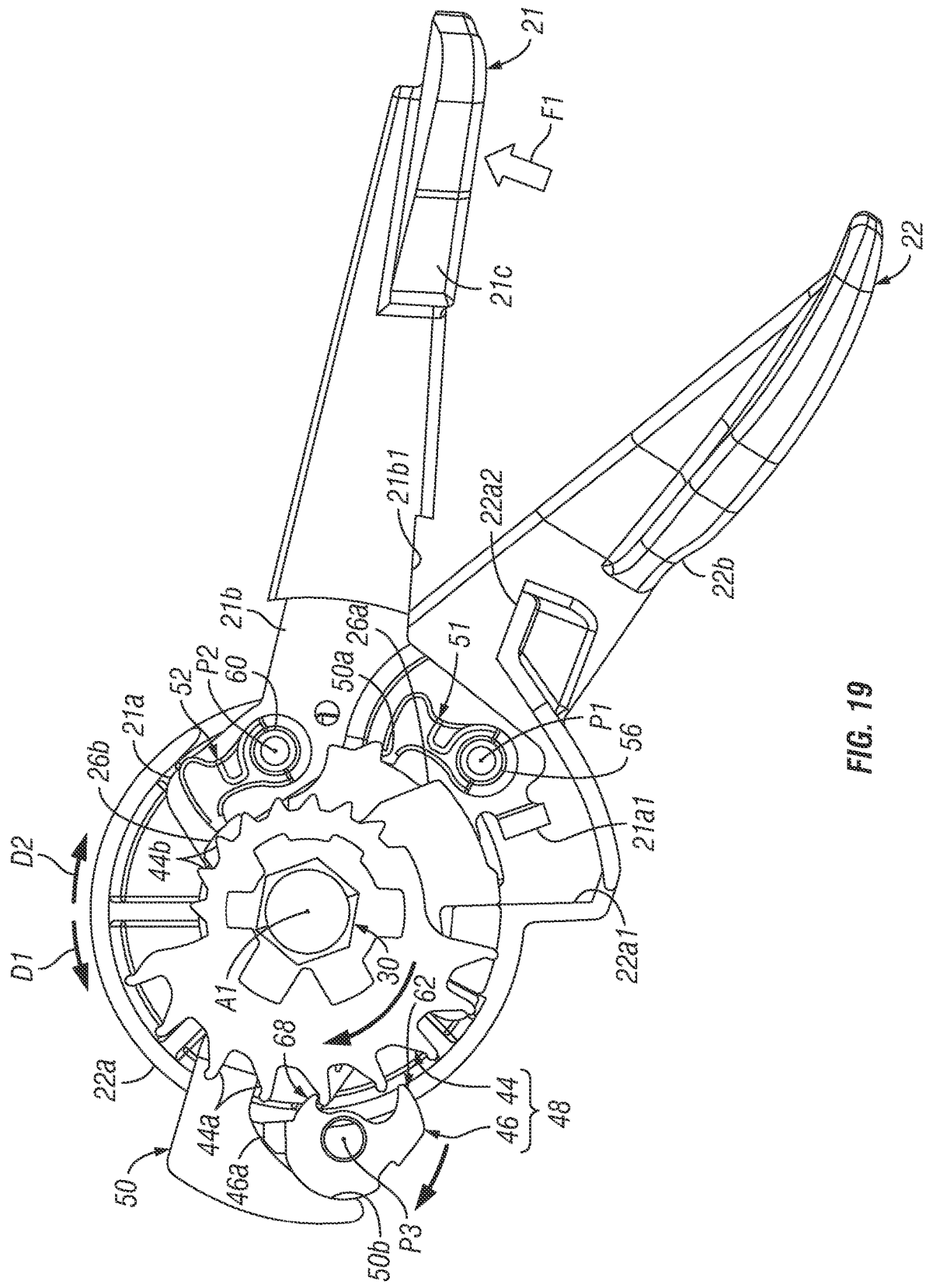
FIG. 19 is a top view of the positioning mechanism and the first user operated member and the second user operated member illustrated in FIGS. 16 to 18, but in which the first user operated member has been moved further from the position illustrated in FIG. 18 to the first operated position where the release member is in the second position and the positioning pawl is in the releasing position.
Figure 20:
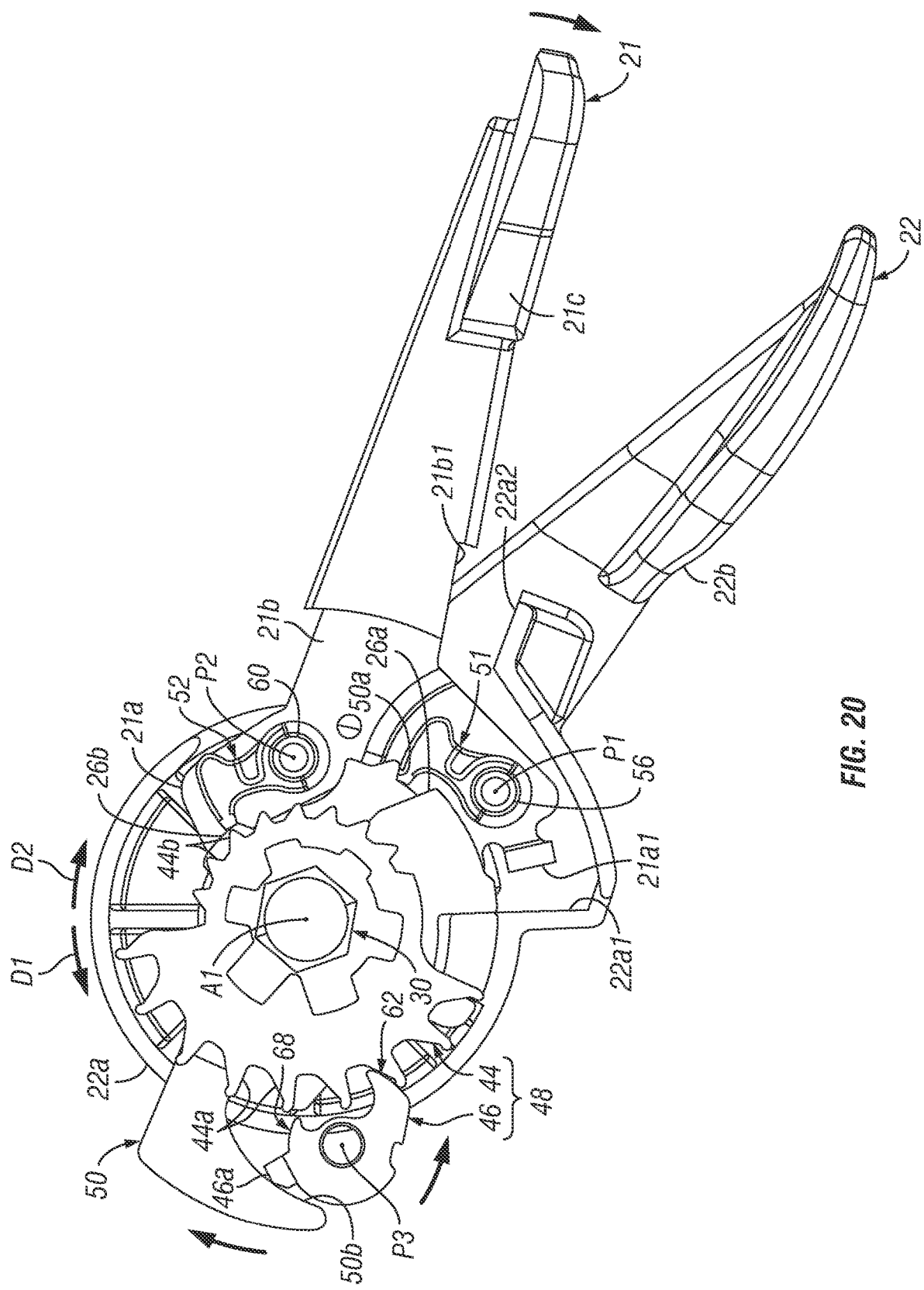
FIG. 20 is a top view of the positioning mechanism and the first user operated member and the second user operated member illustrated in FIGS. 16 to 19 in which the first user operated member has been released after reaching the first operated position and starts returning towards the first non-operated position.
Figure 21:
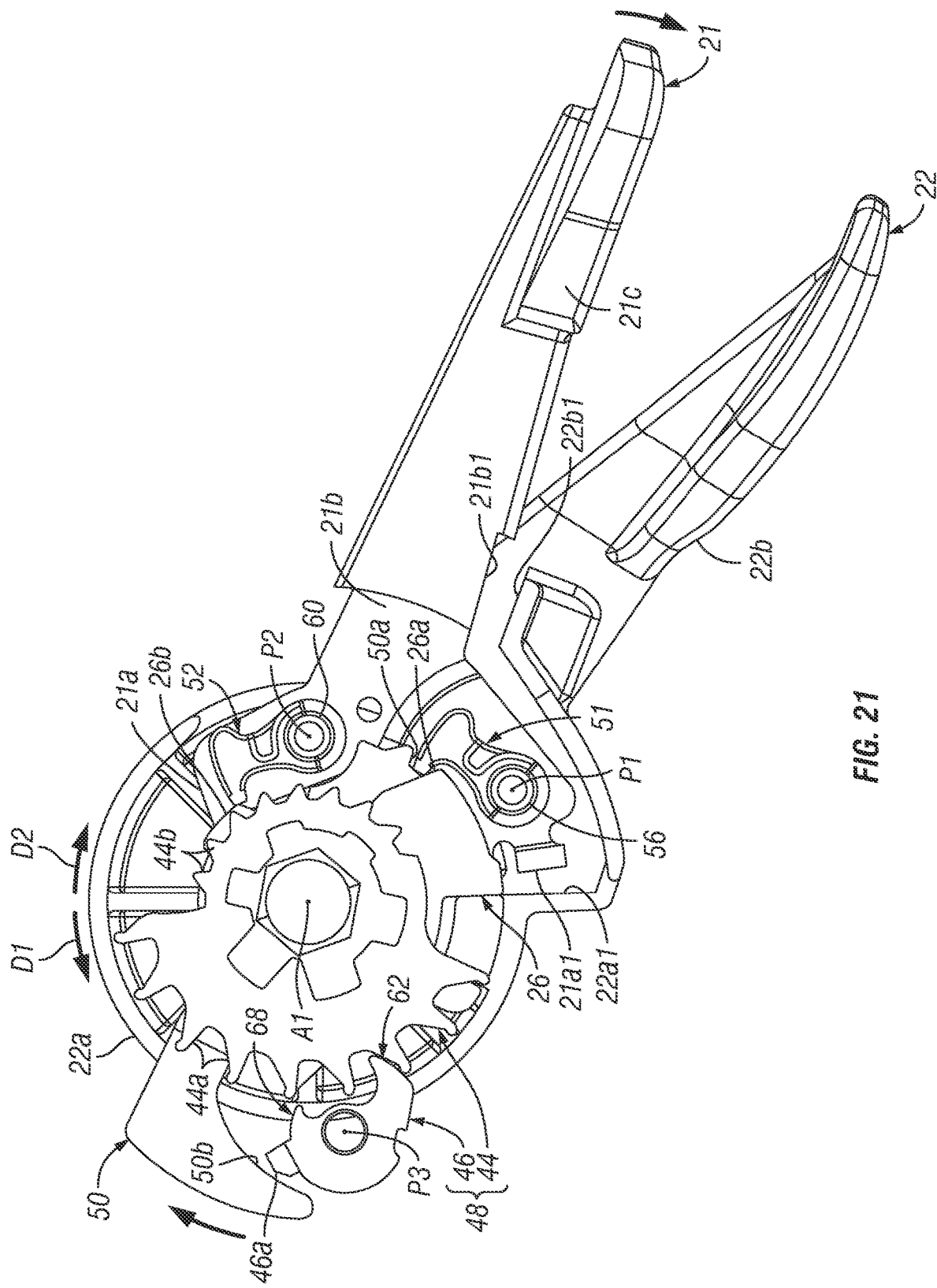
FIG. 21 is a top view of the positioning mechanism and the first user operated member and the second user operated member illustrated in FIGS. 16 to 20 in which the first user operated member has returned to the first non-operated position.
Figure 22:
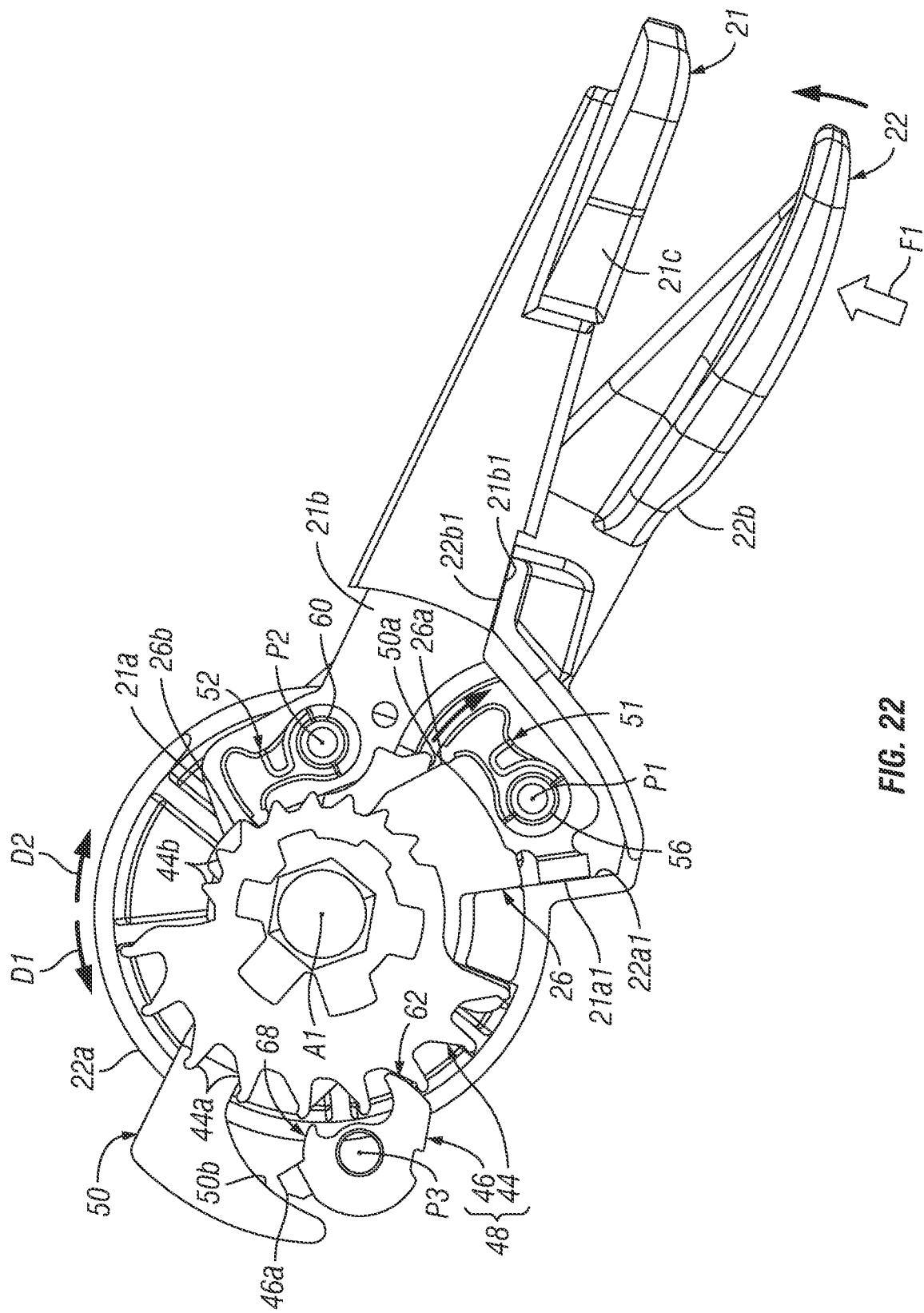
FIG. 22 is a top view of the positioning mechanism and the first user operated member and the second user operated member illustrated in FIGS. 16 to 21, but in which the second user operated member has been slightly moved towards the second operated position to start a cable pulling operation where the second user operated member contacts the first user operated member, the first pawl is moved out of contact with the release member and the second pawl is moved out into engagement with the ratchet member.
Figure 23:
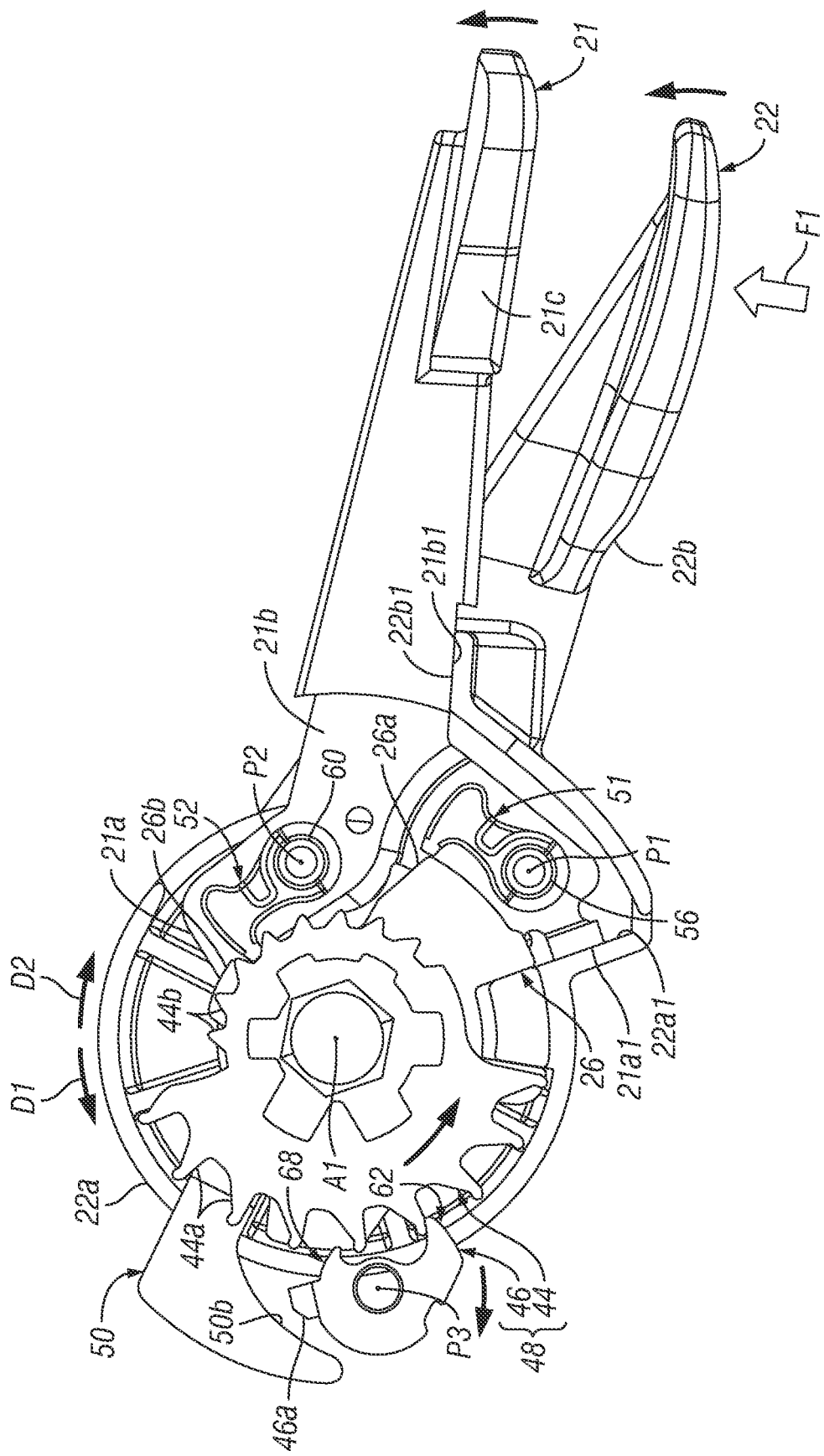
FIG. 23 is a top view of the positioning mechanism and the first user operated member and the second user operated member illustrated in FIGS. 16 to 22, but in which the second user operated member has been moved more towards the second operated position such that the first user operated member and the second user operated member move together and the ratchet member is pivoted.

To accomplish the releasing operation and the pulling operation of the ratchet member 44, as seen in FIGS. 10, 11 and 16, the operating device 10 further comprises a release member 50, a first pawl 51 and a second pawl 52. The release member 50 is movably arranged with respect to the support structure 24 between a first position (FIG. 16) and a second position (FIG. 19). In particular, the release member 50 is pivotally mounted on the fixing bolt 30 to pivot about the common mounting axis A1. The first pawl 51 and the second pawl 52 are positioned radially outward from the release member 50 with respect to the common mounting axis A1. As seen in FIG. 11, the first pawl 51 is partly offset from the second pawl 52 in an axial direction with respect to the common mounting axis A1. In this way, the first pawl 51 can engage the release member 50, while the second pawl 52 cannot engage the release member 50.

Preferably, the release member 50 is biased towards the first position. Specifically, the operating device 10 further comprises a third biasing member 54 for biasing the release member 50 is towards the first position (FIG. 16). Here, as viewed from above in the state where the operating device 10 is attached to the handlebar H, the second user operating member 22 is disposed below the first user operating member 21. In particular, as viewed from above in the state where the operating device 10 is attached to the handlebar H, the attachment portion 21a of the first user operating member 21 overlaps with the attachment portion 22a of the second user operating member 22. The first pawl 51 and the second pawl 52 are mounted on the upper surface of the first user operating member 21 as viewed from above in the state where the operating device 10 is attached to the handlebar H. Thus, the first pawl 51 and the second pawl 52 overlap the first user operating member 21 as viewed from above in the state where the operating device 10 is attached to the handlebar H. Also, the first pawl 51 and the second pawl 52 as viewed from above in the state where the operating device 10 is attached to the handlebar H.

Referring to FIGS. 10 to 19, as mentioned above, the release member 50 is movably arranged around the common mounting axis A1. The release member 50 is a rigid member. Here, for example, the release member 50 is preferably a plate-shaped member that is made of a suitable rigid material such a metallic material. However, the release member 50 is not limited to the plate as shown. Here, the release member 50 is biased towards the first position (FIG. 16) by the third biasing member 54 (FIG. 10). In particular, the third biasing member 54 is operatively disposed between the housing 14 and the release member 50 to bias the release member 50 in the second direction D2 about the common mounting axis A1. In the illustrated embodiment, for example, the third biasing member 54 is a coiled compression spring. The third biasing member 54 has a first end engaged with the housing 14 and a second end engaged with the release member 50. Preferably, the third biasing member 54 is preloaded where the release member 50 is in the first position (FIG. 16).

With the illustrated configuration, the release member 50 is configured to selectively engage the positioning member 46 in response to the first user operating member 21 being operated in the first direction D1. Basically, the release member 50 includes an abutment 50a that is configured to be engaged by the first pawl 51 in response to the first user operating member 21 being operated in the first direction D1. This engagement of the first pawl 51 with the abutment 50a causes the release member 50 to be pivoted in the first direction D1 in response to the first user operating member 21 being operated in the first direction D1. As a result of the first user operating member 21 being operated in the first direction D1, the release member 50 engages and moves the positioning member 46 to disengage the positioning member 46 from the ratchet member 44. In particular, the release member 50 includes a contact surface 50b that is configured to contact and move the positioning member 46 to disengage the positioning member 46 from the ratchet member 44.

Referring to FIGS. 10 and 16 to 19, the first pawl 51 is pivotally supported on the first user operating member 21 around a first pivot axis P1. Specifically, the first pawl 51 is pivotally mounted on the first user operating member 21 by a first pivot pin 56. The first pivot axis P1 is defined by a center longitudinal axis of the first pivot pin 56. The first pawl 51 is configured to move the release member 50 from the first position to the second position during movement of the first user operating member 21 from the first non-operated position to the first operated position. In the illustrated embodiment, the first pawl 51 constitutes a release pawl.

Preferably, as in the illustrated embodiment, the first pawl 51 is biased towards engagement with the release member 50. For example, the operating device 10 further comprises a fourth biasing member 58 that biases the first pawl 51 is biased towards engagement with the release member 50. In particular, as seen in FIG. 16, the first pawl 51 contacts the release member 50 where the first user operating member 21 is disposed in the first non-operated position. Preferably, the fourth biasing member 58 is preloaded where the first user operating member 21 is disposed in the first non-operated position and the first pawl 51 contacts the release member 50. In the illustrated embodiment, the fourth biasing member 58 is a torsion spring. The fourth biasing member 58 is mounted on the first pivot pin 56. Specifically, the fourth biasing member 58 has a coiled portion that is mounted on the first pivot pin 56. The fourth biasing member 58 has a first end engaged with the first user operating member 21 and a second end engaged with the first pawl 51.

Similarly, the second pawl 52 is pivotally supported on the first user operating member 21 around a second pivot axis P2. The second pawl 52 is configured to move the ratchet member 44 in the pulling direction D1. In the illustrated embodiment, the second pawl 52 constitutes a pulling pawl. Specifically, the second pawl 52 is pivotally mounted on the first user operating member 21 by a second pivot pin 60. The second pivot axis P2 is defined by a center longitudinal axis of the second pivot pin 60. The second pivot axis P2 is offset from the first pivot axis P1. The common mounting axis A1 is offset from the first pivot axis P1 and the second pivot axis P2. Here, the first pawl 51 and the second pawl 52 are preferably identical. Thus, the same part can be manufactured for both the first pawl 51 and the second pawl 52. By making the first pawl 51 and the second pawl 52 identical, the costs in manufacturing the operating device 10 can be reduced.

Preferably, as in the illustrated embodiment, the second pawl 52 is biased towards engagement with the ratchet member 44. However, the second pawl 52 is spaced from the ratchet member 44 where the first user operating member 21 is disposed in the first non-operated position. In particular, as seen in FIG. 16, the second pawl 52 contacts the abutment member 26 of the second user operating member 22 where the first user operating member 21 is disposed in the first non-operated position. In this way, the second pawl 52 prevented from engaging the ratchet member 44 where the first user operating member 21 is disposed in the first non-operated position. Thus, the second pawl 52 does not interfere with operation of the first user operating member 21 to perform a releasing operation.

In the illustrated embodiment, the operating device 10 further comprises a fifth biasing member 61 that biases the second pawl 52 is biased towards engagement with the ratchet member 44. Preferably, the fifth biasing member 61 is preloaded where the first user operating member 21 is disposed in the first non-operated position and the second pawl 52 contacts the abutment member 26 of the second user operating member 22. In the illustrated embodiment, the fifth biasing member 61 is a torsion spring. The fifth biasing member 61 is mounted on the second pivot pin 60. Specifically, the fifth biasing member 61 has a coiled portion mounted on the second pivot pin 60. The fifth biasing member 61 has a first end engaged with the first user operating member 21 and a second end engaged with the second pawl 52.

As seen in FIGS. 21 to 27, during a pulling operation using the second user operating member 22, the abutment member 26 of the second user operating member 22 is configured to move the first pawl 51 to prevent the first pawl 51 from pivoting the release member 50 from the first position to the second position. Specifically, the first abutment 26a is configured to pivot the first pawl 51 about the first pivot axis P1 in response to the second user operating member 22 being moved from the second non-operated position to the second operated position. In this way, the first pawl 51 does not engage the abutment 50a to pivot the release member 50 into engagement with the positioning member 46. While the first pawl 51 may contact the abutment 50a and causes a small amount of pivotal movement of the release member 50, the first abutment 26a is configured such that the first pawl 51 is disengaged from the abutment 50a before the release member 50 moves the positioning member 46 out of engagement with the ratchet member 44.

Figure 24:
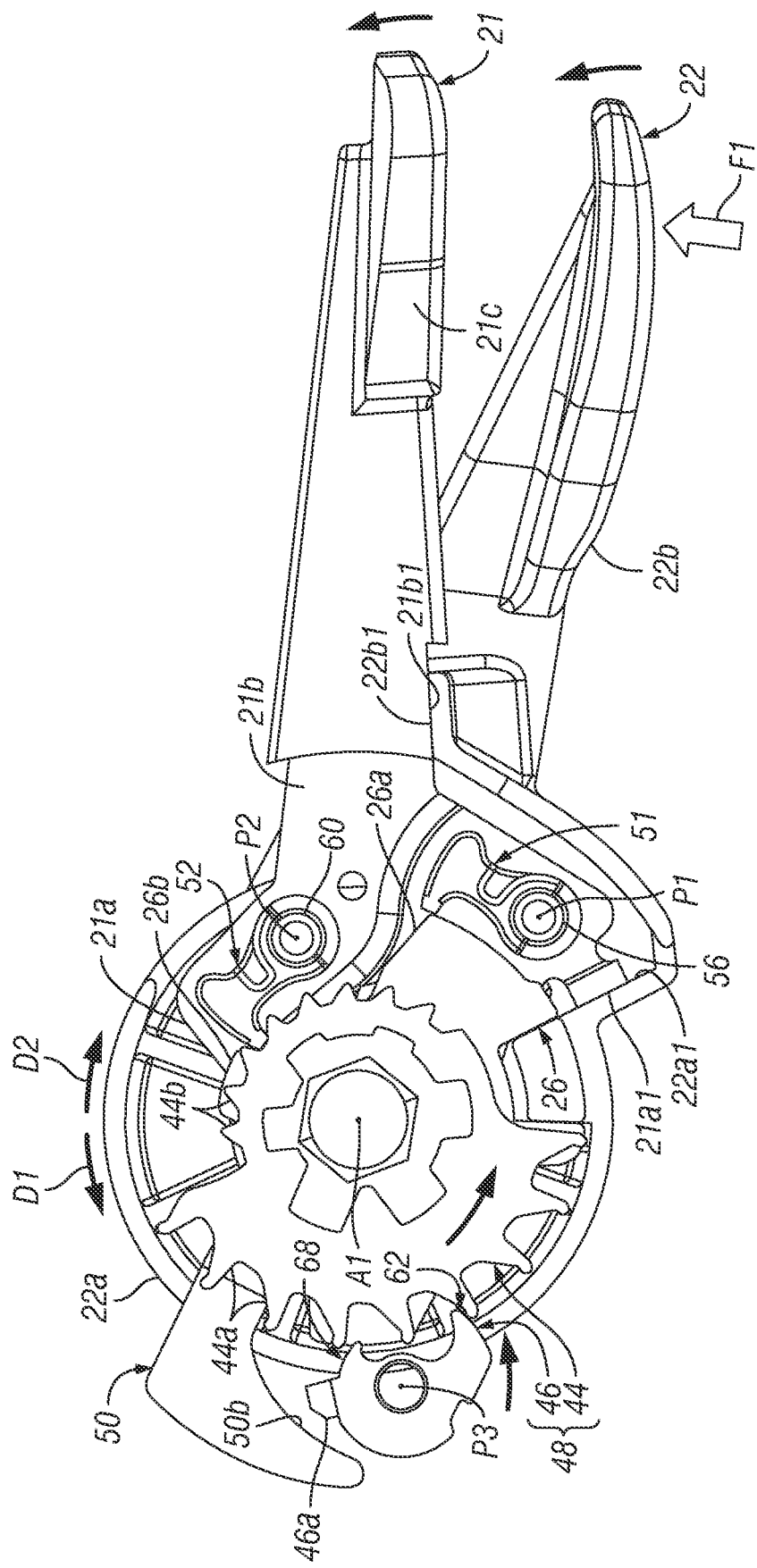
FIG. 24 is a top view of the positioning mechanism and the first user operated member and the second user operated member illustrated in FIGS. 16 to 23, but in which the second user operated member has been moved from the position illustrated in FIG. 21 more towards the second operated position such that the first user operated member, the second user operated member and the ratchet member move to shift from one of the predetermined positions to the next adjacent predetermined position.
Figure 25:
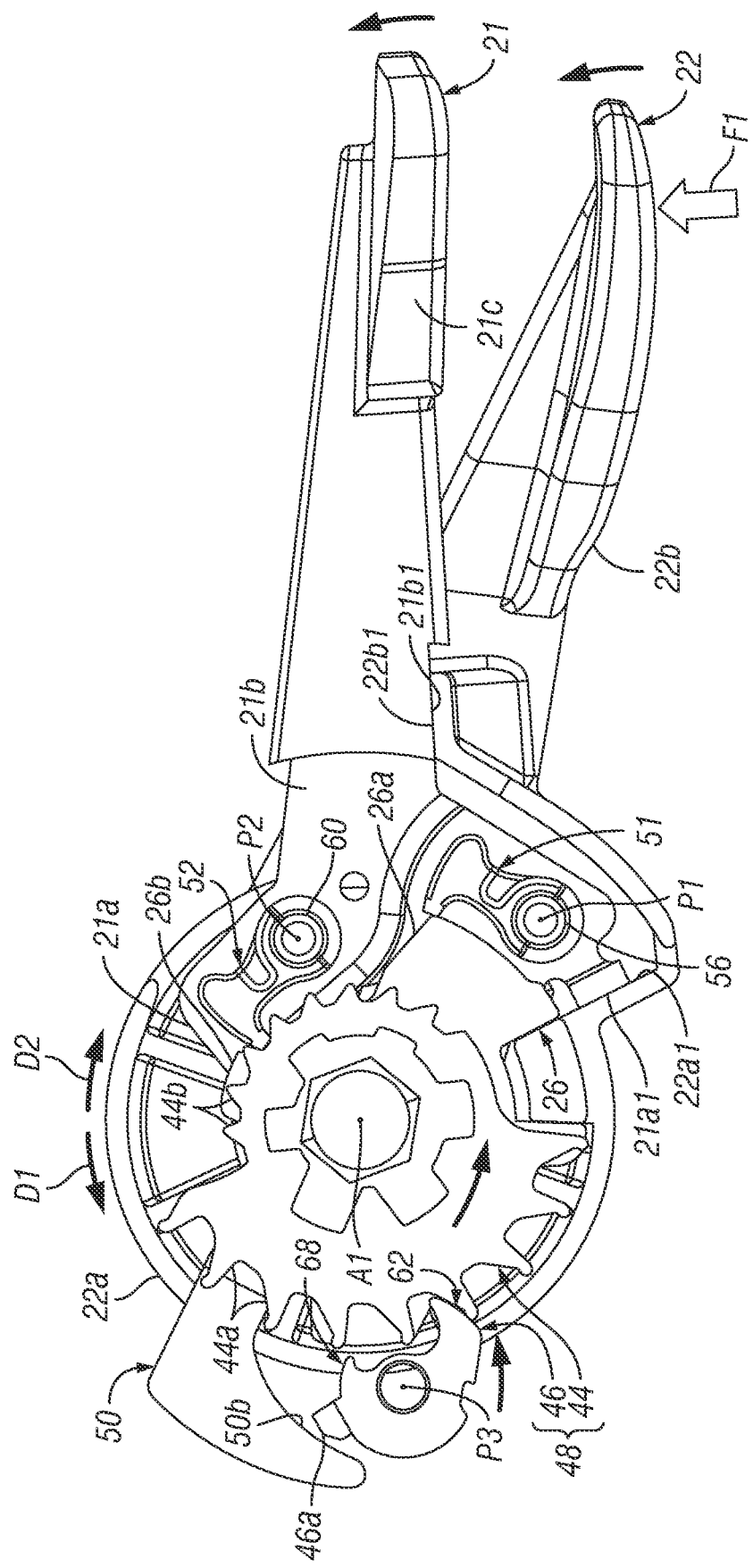
FIG. 25 is a top view of the positioning mechanism and the first user operated member and the second user operated member illustrated in FIGS. 16 to 24, but in which the second user operated member has been moved from the position illustrated in FIG. 24 more towards the second operated position such that one shift operation is completed.
Figure 26:
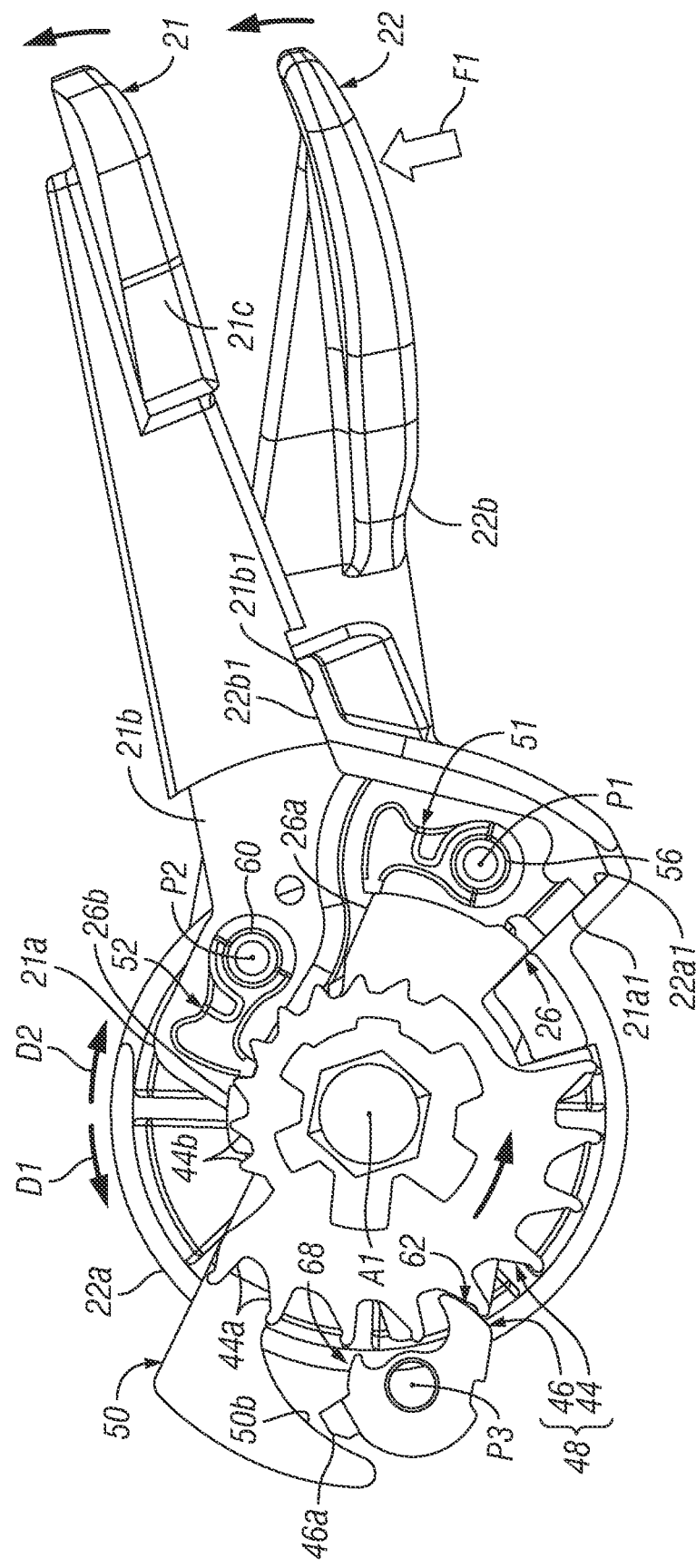
FIG. 26 is a top view of the positioning mechanism and the first user operated member and the second user operated member illustrated in FIGS. 16 to 25, but in which the second user operated member has been moved from the position illustrated in FIG. 25 more towards the second operated position such that a second shift operation is completed without moving the second user operated member towards the second non-operated position.
Figure 27:
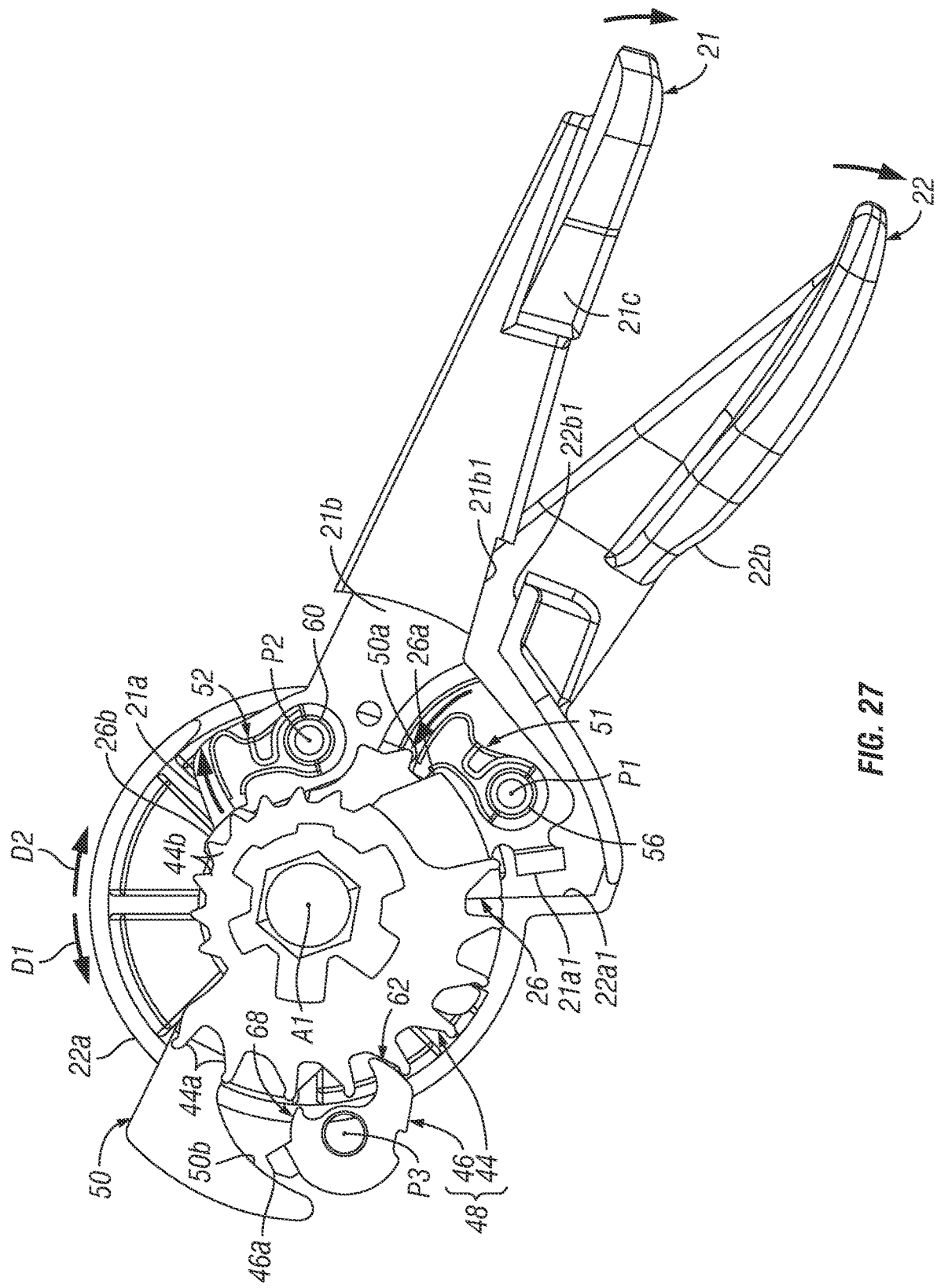
FIG. 27 is a top view of the positioning mechanism and the first user operated member and the second user operated member illustrated in FIGS. 16 to 26 in which the first user operated member and the second user operated member have returned to their non-operated positions.

As seen in FIGS. 21 to 27, during a pulling operation using the second user operating member 22, the abutment member 26 of the second user operating member 22 is further configured to cause the second pawl 52 to engage the ratchet member 44. Specifically, the second abutment 26b is configured to permit the second pawl 52 to pivot about the second pivot axis P2 towards engagement with the ratchet member 44 in response to the second user operating member 22 being moved from the second non-operated position to the second operated position. In this way, the second pawl 52 moves into engagement with the ratchet member 44 so that the ratchet member 44 is pivoted in the first (pulling) direction D1. Also, as mentioned above, the second user operating member 22 includes a contact surface 22a1 and/or 22b1. The first contact surface 22a1 and contact surface 22b1 of the second user operating member 22 contact the first contact surface 21a1 and contact surface 21b1 of the first user operating member 21 as the second user operating member 22 moves from the second non-operated position (FIG. 21) towards the second operated position (FIG. 24).

In the illustrated embodiment, as seen in FIGS. 10, 15 and 16, the ratchet member 44 is pivotally mounted on the fixing bolt 30 to pivot about the common mounting axis A1. Thus, the ratchet member 44 is configured to pivot around the common mounting axis A1. The ratchet member 44 is configured to move the first direction D1 and the second direction D2. As explained below, the ratchet member 44 is biased in the second direction D2 (i.e., the releasing direction) with respect to the support structure 24. Here, the ratchet member 44 includes a plurality of first teeth 44a and a plurality of second teeth 44b. In the illustrated embodiment, the first teeth 44a are ratchet teeth that form positioning teeth, the second teeth 44b are drive teeth that form pulling teeth.

The positioning member 46 is movably supported with respect to the support structure 24 to selectively engage the first teeth 44a to establish the plurality of the predetermined positions. More specifically, the positioning member 46 is movably arranged with respect to the support structure 24 between a holding position and a releasing position. Here, the positioning member 46 includes a positioning pawl 62. The positioning pawl 62 is movably supported with respect to the support structure 24 between the holding position and the releasing position. Basically, where the positioning pawl 62 is in the holding position, the positioning pawl 62 is engaged with one of the first teeth 44a. In other words, the positioning pawl 62 is selectively engaged with the ratchet member 44 to selectively establish the predetermined positions in the holding position. On the other hand, where the positioning pawl 62 is in the releasing position, the positioning pawl 62 is disengaged from the ratchet member 44 to permit the ratchet member 44 to move with respect to the support structure 24. In particular, the release member 50 is configured to disengage the positioning pawl 62 from the ratchet member 44 for permitting movement of the ratchet member 44 in a releasing direction during movement of the release member 50 from the first position to the second position. Specifically, the positioning member 46 includes an abutment 46a in which the release member 50 contacts to move the positioning pawl 62 from the holding position to the releasing position. More specifically, during a releasing operation using the first user operating member 21, the contact surface 50b of the release member 50 contacts the abutment 46a of the positioning member 46 to move the positioning pawl 62 from the holding position to the releasing position.

On the other hand, during a pulling operation using the second user operating member 22, the ratchet teeth 44a of the ratchet member 44 are configured to contact the positioning pawl 62 and to cause the positioning pawl 62 to move from the holding position to the releasing position. In this way, the positioning pawl 62 is selectively moved between the first teeth 44a to selectively establish the predetermined positions in the holding position. In other words, the positioning pawl 62 engages the first teeth 44a of the ratchet member 44 to selectively establish the predetermined positions of the ratchet member 44 with respect to the support structure 24 where the positioning pawl 62 is in the holding position for maintaining the position of the ratchet member 44. The positioning pawl 62 is biased towards the holding position as explained below.

Here, the positioning pawl 62 is pivotally supported with respect to the support structure 24 about a third pivot axis P3. The third pivot axis P3 is offset from the first pivot axis P1 and the second pivot axis P2. The third pivot axis P3 is parallel to the common mounting axis A1, the first pivot axis P1 and the second pivot axis P2. Specifically, the positioning pawl 62 is pivotally mounted on a third pivot pin 64 that is supported between the support structure 24 and the second housing portion 14B. The third pivot axis P3 is defined by a center longitudinal axis of the third pivot pin 64. The positioning member 46 is biased towards the ratchet maintaining position as explained below.

In this embodiment, the positioning member 46 further includes a stop pawl 66. Basically, the stop pawl 66 is movably arranged with respect to the support structure 24 between a stopping position where the stop pawl 66 stops a releasing movement of the ratchet member 44 and a non-stopping position where the stop pawl 66 permits the releasing movement of the ratchet member 44. In the stopping position, the stop pawl 66 is configured to be disposed in a path of the ratchet member 44. In the non-stopping position, the stop pawl 66 is configured to be spaced from the ratchet member 44. The stop pawl 66 is provided to ensure that the ratchet member 44 moves only one of the predetermined positions within a certain range of movement of the second user operating member 22. In the illustrated embodiment, the operating device 10 only shifts one of the predetermined positions at a time for a single progressive movement of the second user operating member 22. Here, the stop pawl 66 and the positioning pawl 62 are integrally formed. More preferably, as in the illustrated embodiment, the stop pawl 66 and the positioning pawl 62 are a one-piece member. Thus, in this embodiment, the positioning pawl 62 and the stop pawl 66 are pivotally mounted as a single unit to the support structure 24. Thus, the stop pawl 66 pivots on the third pivot axis P3 as the stop pawl 66 moves between the non-stopping position (FIG. 16) and the stopping position (FIG. 19). Alternatively, the positioning pawl 62 and the stop pawl 66 can be separate parts that move independently of each other. In such a configuration, the positioning pawl 62 and the stop pawl 66 can pivot on the same pivot axis or separate members that pivot on different pivot axes.

As seen in FIGS. 9 to 15, the operating device 10 further comprises a take-up member 70. The take-up member 70 is provided to the ratchet member 44. In particular, the take-up member 70 is arranged to rotate together with the ratchet member 44 as the ratchet member 44 rotates with respect to the support structure 24. Basically, the ratchet member 44 is non-movably coupled to the take-up member 70 such that the take-up member 70 and the ratchet member 44 move as a unit with respect to the support structure 24. Thus, the take-up member 70 is fixed with respect to the ratchet member 44 in the first direction D1 and the second direction D2. The position of the take-up member 70 with respect to the support structure 24 is selectively established by the first teeth 44a selectively engaged and disengaged with the positioning pawl 62. Here, the take-up member 70 and the ratchet member 44 are separate parts that are coupled together to move as a unit. Alternatively, the ratchet member 44 can be integrally formed as a part of the take-up member 70 so as to be a one-piece member.

The take-up member 70 includes a cable attachment structure 70a configured to attach the cable C to the take-up member 70. In particular, the inner wire C2 is attached to the cable attachment structure 70a of the take-up member 70 by the cable attachment barrel on the end of the inner wire C2. The take-up member 70 is pivotally mounted to the support structure 24 by the fixing bolt 30. The take-up member 70 pivots with to the support structure 24 in the first direction D1, which corresponds to a pulling direction, and pivots with to the support structure 24 in the second direction D2, which corresponds to the releasing direction. In other words, the take-up member 70 is configured to move with respect to the support structure 24 to selectively move the cable C in a pulling direction and a releasing direction that is opposite to the pulling direction.

Referring to FIGS. 9, 10 and 15, preferably, the take-up member 70 and the ratchet member 44 are biased in the releasing direction D2 with respect to the support structure 24. Here, the bicycle operating device 10 further comprises a sixth biasing member 72 biasing the take-up member 70 towards the releasing direction. The sixth biasing member 72 is provided between the first support 24 of the support structure 24 and the take-up member 70 to biasing the take-up member 70 in the second direction D2. Here, the sixth biasing member 72 is a coiled torsion spring having a first free end engaged in a notch of the take-up member 70 and a second free end of the sixth biasing member 72 engaged in a notch of the first support 24 of the support structure 24. The sixth biasing member 72 is preferably preloaded to bias the take-up member 70 in the second direction D2 against an abutment of the support structure 24.

Referring back to FIG. 9, in the illustrated embodiment, the operating device 10 is also provided with a position indicator 80 to indicate a current position of the operating device 10 as explained below. The position indicator 80 is optional, and con be omitted if needed and/or desired. The position indicator 80 indicates a current position among the predetermined positions of the ratchet member 44 and the take-up member 70. Here, the position indicator 80 is pivotally mounted between the first support 24 and the first housing portion 14A.

The position indicator 80 is operatively coupled to the take-up member 70 such that the position indicator 80 pivots in response to rotation of the take-up member 70. In particular, the take-up member 70 further comprises a cam surface 70b that is operatively coupled to the position indicator 80. The cam surface 70b is eccentric with respect to the common mounting axis A1. In particular, the position indicator 80 has an indicating arm 80a, a control arm 80b and a pivot hub 80c as seen in FIG. 9. The indicating arm 80a and the control arm 80b extend in opposite directions from the pivot hub 80c. The pivot hub 80c is pivotally disposed between the first support 24 and the first housing portion 14A. A biasing element 82 is provided to the pivot hub 80c for biasing the control arm 80b of the position indicator 80 into contact with the cam surface 70b. The indicating arm 80a extends from the pivot hub 80c so that a tip of the free end of the indicating arm 80a is visible in a lens 14C of the housing 14. The control arm 80b contacts the edge of the cam surface 70b so that the position indicator 80 pivots as the cam surface 70b rotates about the common mounting axis A1. This pivotal movement of the position indicator 80 cause the indicating arm 80a to move in the window of the housing 14 to indicate a current position of the ratchet member 44 and the take-up member 70.

Figure 18:
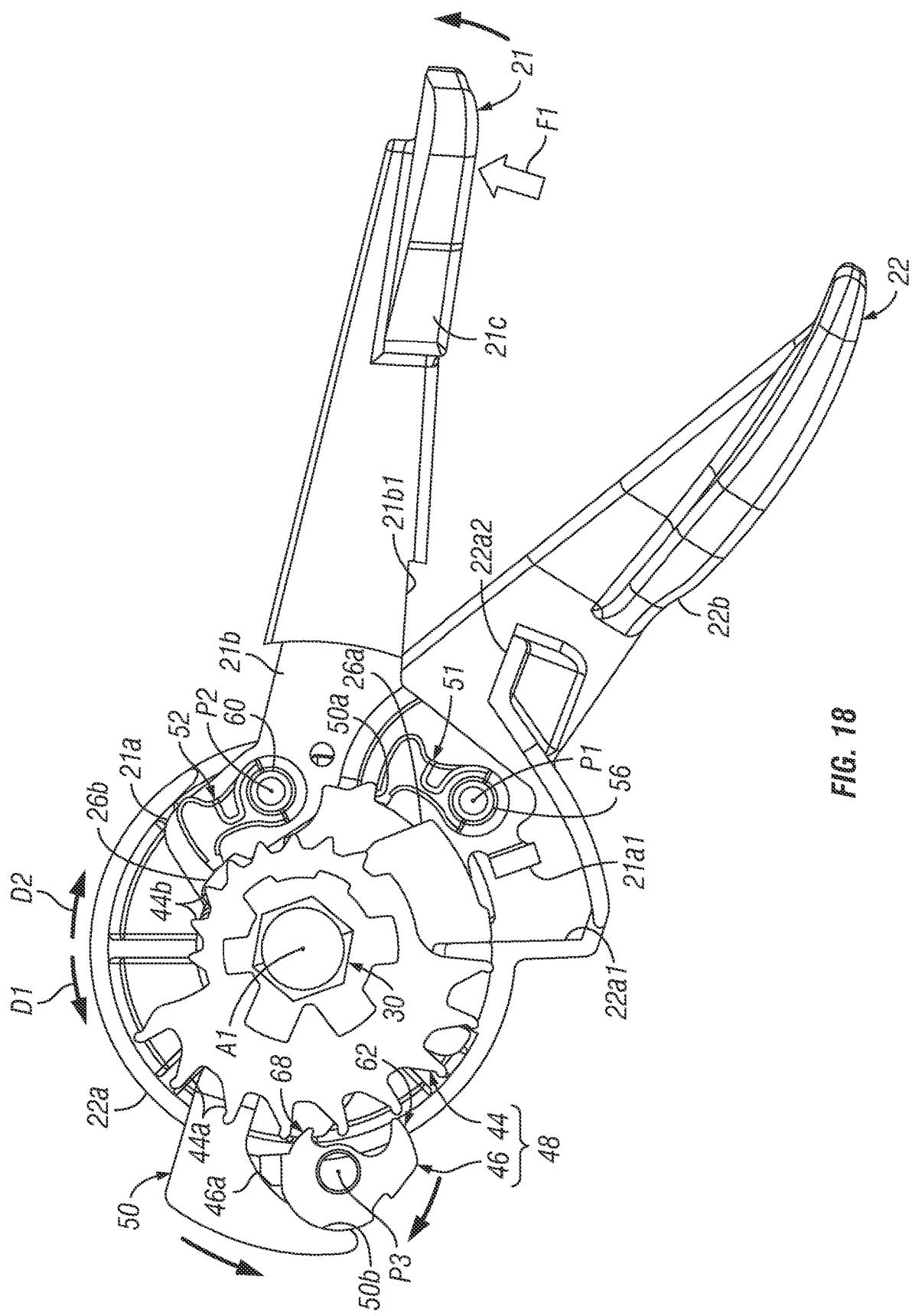
FIG. 18 is a top view of the positioning mechanism and the first user operated member and the second user operated member illustrated in FIGS. 16 and 17, but in which the first user operated member has been moved further from the position illustrated in FIG. 17 towards the first operated position where the release member moves from further towards the second position and the positioning pawl start starts to move from the holding position towards the releasing position.

As seen in FIGS. 16 to 20, during a releasing operation, the first user operating member 21 is pivoted by a user about the common mounting axis A1 in the first direction D1 (the counterclockwise direction in FIGS. 16 to 20). In the illustrated embodiment, the second user operating member 22 is configured to remain stationary during the releasing operation. In particular, during a releasing operation, the first user operating member 21 pivots about the common mounting axis A1 and the first pawl 51 engages the release member 50. Then, the first user operating member 21 and the release member 50 pivot together about the common mounting axis A1. Basically, the release member 50 pivots from the first position (FIG. 16) and the second position (FIG. 18). This pivotal movement of the release member 50 causes the contact surface 50b of the release member 50 to contact the abutment 46a of the positioning member 46. This contact between the contact surface 50b of the release member 50 and the abutment 46a of the positioning member 46 causes the positioning pawl 62 to move from the holding position (FIG. 16) to the releasing position (FIG. 18). This contact between the contact surface 50b of the release member 50 and the abutment 46a of the positioning member 46 also causes the stop pawl 66 to move into the path of the first teeth 44a. In this way, the ratchet member 44 and the take-up member 70 can move in the second direction D2 from a current one of the predetermined positions to the next adjacent one of the predetermined positions. Thus, this interaction of the ratchet member 44 and the stop pawl 66 results in the ratchet member 44 and the take-up member 70 moving a single one of the predetermined positions. Upon the first user operating member 21 being released by the user, the first user operating member 21 moves back to the first non-operated position, the release member 50 pivots back to the second position, and the positioning pawl 62 move back to the releasing position.

As seen in FIGS. 21 to 27, during a pulling operation, the second user operating member 22 is pivoted by a user about the common mounting axis A1 in the first direction D1 (the counterclockwise direction in FIGS. 21 to 27). In particular, during a pulling operation, the second user operating member 22 together with the abutment member 26 pivots about the common mounting axis A1. This pivotal movement of the second user operating member 22 and the abutment member 26 causes the abutment member 26 to contact and move the first pawl 51 out of engagement with the release member 50. This pivotal movement of the second user operating member 22 and the abutment member 26 also causes the second pawl 52 to move off of the second abutment 26b and engage one of the second teeth 44b of the ratchet member 44. Then, further pivotal movement of the second user operating member 22 and the abutment member 26 causes the first user operating member 21 to be moved by the second user operating member 22 as the second user operating member 22 is moved to perform a pulling operation. More specifically, the first contact surface 22a1 and the second contact surface 22b1 of the second user operating member 22 contact the first contact surface 21a1 and the second contact surface 21b1 of the first user operating member 21 such that the first user operating member 21 and the second user operating member 22 pivot together around the common mounting axis A1 in the first direction D1. Also, further pivotal movement of the second user operating member 22 and the abutment member 26 causes the second pawl 52 to pivot the ratchet member 44 such that the positioning pawl 62 ratches over the first teeth 44a of the ratchet member 44. In this way, the ratchet member 44 and the take-up member 70 can move in the first direction D1 from a current one of the predetermined positions to the next adjacent one of the predetermined positions. Thus, this interaction of the ratchet member 44 and the stop pawl 66 results in the ratchet member 44 and the take-up member 70 moving one or more of the predetermined positions depending on how far the second user operating member 22 is pivoted by the user in the first direction D1. Upon the second user operating member 22 being released by the user, the second user operating member 22 moves back to the second non-operated position, the first pawl 51 pivots back into contact with the release member 50, and the second pawl 52 is disengaged from the second teeth 44b of the ratchet member 44.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the operating device. Accordingly, these directional terms, as utilized to describe the operating device should be interpreted relative to a human-powered vehicle (e.g., bicycle) in an upright riding position on a horizontal surface and that is equipped with the operating device. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3)

C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operating device for a human-powered vehicle, the operating device comprising:
   a support structure;
   a ratchet member movably supported with respect to the support structure between a plurality of predetermined positions;
   a positioning member including a positioning pawl movably supported with respect to the support structure between a holding position and a releasing position, the positioning pawl being selectively engaged with the ratchet member to selectively establish the predetermined positions in the holding position;
   a release member movably arranged with respect to the support structure between a first position and a second position, the release member being configured to disengage the positioning pawl from the ratchet member for permitting movement of the ratchet member in a releasing direction during movement of the release member from the first position to the second position;
   a first user operating member movably supported with respect to the support structure from a first non-operated position to a first operated position;
   a first pawl pivotally supported on the first user operating member around a first pivot axis, the first pawl being configured to move the release member from the first position to the second position during movement of the first user operating member from the first non-operated position to the first operated position; and
   a second pawl pivotally supported on the first user operating member around a second pivot axis, the second pivot axis being offset from the first pivot axis, the second pawl being configured to move the ratchet member in a pulling direction, the pulling direction being different from the releasing direction.

2. The operating device according to claim 1, wherein the first pawl is biased towards engagement with the release member.

3. The operating device according to claim 2, wherein the first pawl contacts the release member where the first user operating member is disposed in the first non-operated position.

4. The operating device according to claim 1, wherein the second pawl is biased towards engagement with the ratchet member.

5. The operating device according to claim 1, wherein the second pawl is spaced from the ratchet member where the first user operating member is disposed in the first non-operated position.

6. The operating device according to claim 1, wherein the positioning pawl is biased towards the holding position.

7. The operating device according to claim 1, wherein the positioning pawl is pivotally supported with respect to the support structure about a third pivot axis, the third pivot axis is offset from the first pivot axis and the second pivot axis.

8. The operating device according to claim 1, wherein the release member is biased towards the first position.

9. The operating device according to claim 1, wherein the positioning member includes a stop pawl movably arranged with respect to the support structure between a stopping position where the stop pawl stops a releasing movement of the ratchet member and a non-stopping position where the stop pawl permits the releasing movement of the ratchet member.

10. The operating device according to claim 9, wherein the positioning pawl and the stop pawl are pivotally mounted as a single unit to the support structure.

11. The operating device according to claim 1, further comprising
a second user operating member movably arranged with respect to the support structure between a second non-operated position and a second operated position.

12. The operating device according to claim 11, wherein the second user operating member includes a first abutment configured to pivot the first pawl about the first pivot axis in response to the second user operating member being moved from the second non-operated position to the second operated position.

13. The operating device according to claim 11, wherein
the second user operating member includes a second abutment configured to permit the second pawl to pivot about the second pivot axis towards engagement with the ratchet member in response to the second user operating member being moved from the second non-operated position to the second operated position.

14. The operating device according to claim 11, wherein
the first user operating member is biased towards the first non-operated position, and
the second user operating member is biased towards the second non-operated position.

15. The operating device according to claim 11, wherein
the first user operating member and the second user operating member are pivotally mounted with respect to the support structure about a common mounting axis that is offset from the first pivot axis and the second pivot axis.

16. The operating device according to claim 11, wherein
the second user operating member includes a contact surface configured to move the first user operating member as the second user operating member moves from the second non-operated position towards the second operated position.

17. The operating device according to claim 11, wherein
the second user operating member is configured to remain stationary as the first user operating member moves from the first non-operated position towards the first operated position.

18. The operating device according to claim 1, further comprising
a take-up member provided to the ratchet member.

19. The operating device according to claim 18, wherein
the take-up member and the ratchet member are biased in the releasing direction with respect to the support structure.

20. The operating device according to claim 1, further comprising
a handlebar attachment coupled to the support structure.

21. The operating device according to claim 1, wherein
the first pawl is supported by a pivot pin extending through the first user operated member.

* * * * *